(12) United States Patent
Hollowell et al.

(10) Patent No.: US 11,820,214 B2
(45) Date of Patent: Nov. 21, 2023

(54) POP-UP SHELTER SYSTEM AND METHOD FOR VEHICLES

(71) Applicant: SWIC, LLC, Virginia Beach, VA (US)

(72) Inventors: Kelly J. Hollowell, Virginia Beach, VA (US); Philip C. Hollowell, Virginia Beach, VA (US)

(73) Assignee: SWIC, LLC, Virginia Beach, VA (US)

( * ) Notice: Subject to any disclaimer, the term of this patent is extended or adjusted under 35 U.S.C. 154(b) by 0 days.

(21) Appl. No.: 18/164,566

(22) Filed: Feb. 3, 2023

(65) Prior Publication Data

US 2023/0182552 A1     Jun. 15, 2023

Related U.S. Application Data

(63) Continuation-in-part of application No. 17/179,396, filed on Feb. 18, 2021, now Pat. No. 11,584,208, which is a continuation-in-part of application No. 16/701,308, filed on Dec. 3, 2019, now Pat. No. 10,953,734, which is a continuation of application No. 16/197,145, filed on Nov. 20, 2018, now Pat. No. 10,525,805, which is a continuation of application No. 16/125,125, filed on Sep. 7, 2018, now Pat. No. 10,160,298, which is a continuation-in-part of application No. 15/879,943, filed on Jan. 25, 2018, now Pat. No. 10,093,161.

(51) Int. Cl.
*B60J 7/14* (2006.01)
*B60J 7/04* (2006.01)
*B60J 7/10* (2006.01)

(52) U.S. Cl.
CPC ............... *B60J 7/143* (2013.01); *B60J 7/04* (2013.01); *B60J 7/102* (2013.01); *B60Y 2200/86* (2013.01)

(58) Field of Classification Search
CPC ..... B60J 7/14; B60J 7/143; B60J 7/102; B60J 7/04; B60J 2200/86
See application file for complete search history.

(56) References Cited

U.S. PATENT DOCUMENTS

| | | | |
|---|---|---|---|
| 1,425,954 | A | 8/1922 | Fischer |
| 1,845,577 | A | 2/1932 | Hyman |
| 3,214,216 | A | 10/1965 | Brown |
| 3,279,845 | A | 10/1966 | Lutz |
| 3,957,301 | A | 5/1976 | Huber |
| 4,848,827 | A | 7/1989 | Ou |
| 5,039,159 | A | 8/1991 | Bonner |
| 5,429,406 | A | 7/1995 | Huang |

(Continued)

*Primary Examiner* — Noah Chandler Hawk
(74) *Attorney, Agent, or Firm* — HOLLOWELL PATENT GROUP; Kelly Hollowell

(57) ABSTRACT

An apparatus and method for implementing a vehicle sun and rain shield that converts to a pop-up sheltered compartment. The apparatus semi-permanently attaches to the roof of any vehicle. The device is easy to install and does not interfere with the parking and storage profile of the vehicle. The device is sized to fit within the perimeter of any vehicle roof when deployed. The device is easily opened and closed to provide added sun and rain protection. The device has moveable panels that extend beyond the vehicle roof to provide sun and rain protection. The moveable panels deflect in response to contact. The moveable panels also lock in a position perpendicular with the plane of the roof to provide the pop-up sheltered compartment. The sheltered compartment is useful for storing items or providing temporary shelter for users.

30 Claims, 15 Drawing Sheets

(56) References Cited

U.S. PATENT DOCUMENTS

| | | |
|---|---|---|
| 5,762,393 A | 6/1998 | Darmas |
| 6,318,393 B1 | 11/2001 | Glasgo |
| 6,782,904 B2 | 8/2004 | Tien |
| 7,172,233 B2 | 2/2007 | Walker |
| 7,344,182 B1 | 3/2008 | Weddell |
| 7,641,259 B2 | 1/2010 | Techima |
| 8,662,563 B1 | 3/2014 | Hardenbrook |
| 8,845,004 B2 | 9/2014 | DeVoss |

POP-UP SHELTER SYSTEM AND METHOD FOR VEHICLES

CROSS-REFERENCE TO RELATED APPLICATIONS

This application is a continuation-in-part of U.S. application Ser. No. 17/179,396 filed Feb. 18, 2021, which is a continuation-in-part of U.S. application Ser. No. 16/701,308 filed Dec. 3, 2019, issued as U.S. Pat. No. 10,953,734 on Mar. 23, 2021, which is a continuation of U.S. application Ser. No. 16/197,145 filed Nov. 20, 2018, issued as U.S. Pat. No. 10,525,805 on Jan. 7, 2020, which is a continuation of U.S. application Ser. No. 16/125,125 filed Sep. 7, 2018, issued as U.S. Pat. No. 10,160,298 on Dec. 25, 2018, which is a continuation-in-part application of U.S. application Ser. No. 15/879,943 filed Jan. 25, 2018, issued as U.S. Pat. No. 10,093,161 on Oct. 9, 2018, and the entire contents of all the above-referenced applications are hereby incorporated by reference into this application.

BACKGROUND

Golf carts, even covered golf carts, do not provide adequate protection to their occupants against sun and rain. Some after-market products have panels that drop down to cover the sides of a cart and others form a canopy covering the entire cart. These devices are often cumbersome and interfere with ingress to and egress from the golf cart. In addition, most of these devices are hard to install, interfere with the parking profile of the golf cart when it is stored and cannot be easily used in standard golf cart paths that wind through trees and large shrubbery.

In a related application, U.S. application Ser. No. 17/179,396 which has been incorporated herein by reference, the invention is a light weight, portable and self-supporting rain and sun shield that can be fastened to the roof of a golf cart that includes an awning or canopy wider than the golf cart that will not interfere with the golfer's ingress to and egress from a golf cart but still offers protection from sun and rain overhead as well as sideways sun and rain for golfers sitting in the cart. This previously disclosed embodiment is portable, easily attached to and removed from a golf cart and conveniently fits in the umbrella pocket of a golf bag.

The previously disclosed rain and sun shield may comprise a pair of panels sized to fit within the perimeter of a golf cart roof. Each panel of the pair of panels may be movable. Each panel of the pair of panels may angle downward toward the golf cart roof side. The movable panels may be adjustable between a retracted rectilinear position comprising the panels disposed within the perimeter of the roof, and an open rectilinear position wherein the panels extend beyond the roof. At least one panel of the pair of movable panels may be configured to deflect from the open rectilinear position to an open deflected parallelogram position when the at least one panel is contacted by a force. For example, the force deflecting the at least one panel may be a result of an immovable object that contacts the shield during motion of the cart such as, for example brushing up against a tree or the side of a building or even a person. The panel may be configured to deflect based on configuring the panel to rotate or swivel in response to the force. The at least one panel deflected by the force may be configured to automatically return from the position deflected to when the force is removed.

The previously disclosed device is a portable, lightweight sun and rain shield that is placed on top of a golf cart and is supported by a main support rod that rests on the roof of the golf cart parallel to the length of the golf cart. The main support rod may be held in place using stabilizing bars and/or straps that hold the device against the roof of the golf cart. In one embodiment, the device has accordion-like extension arms that are in multiple segments to easily expand away in a perpendicular direction away from the main support rod across the width of the golf cart's roof. In one embodiment, the extension arm segments include an inner segment, an outer segment and a perimeter support rod segment. The outer segments of the extension arms are connected to the perimeter support rod segment on each side of the golf cart for at least two extension arms and are parallel to the main support rod. The perimeter support rod forms the outside perimeter and frame support for the device and cover. In one position the arms extend to the golf cart roofline on each side of the golf cart. In another embodiment, the arms extend beyond the width of the golf cart's roof as much as 120 inches. A nylon or fabric cover is attached to the main support rod, extension arms and perimeter support rods so that when the arms are fully extended the device provides golfers in the cart with a shield from sun and rain. In one embodiment, the cover is attached to the main support rod, extension arms and perimeter support rods by fasteners, rivets, sewn sleeves, Velcro, hooks, snaps, loop and fasteners, ties, and other such fasteners as known in the art.

The previously disclosed device is easily retractable. The extension arms retract adjacent to the main support rod by pivoting the extension arms into a position parallel with the length of the main support rod. The cover folds or crumples inward with the extension arms. The straps and fasteners can be used to secure the device in its collapsed position, and the collapsed or unexpanded device is approximately the same diameter and length as a large golf umbrella so that it fits in the umbrella slot, pouch, compartment, holder, or pocket of a standard golf bag. In one embodiment, the unexpanded device has a diameter of between 2 and 3.5 inches. In one embodiment, the cover extends at least 18 inches beyond each side of the golf cart. In another embodiment, the cover extends at least 24 inches beyond each side of the golf cart. In one embodiment, the cover is angled from the main support rod downward toward each side of the golf cart so that water will drain away from the main support rod. Other embodiments can include a carrying bag equipped with a shoulder strap, golf bag mounting clip, Velcro strap or other suitable attachment for mounting on or connecting to a golf bag while not installed on the golf cart.

What is needed is a collapsible shelter that can pop-up from a rain and sun shield base to provide additional storage space that is semi-permanently attached (i.e. detachably attached) to the roof of a golf cart or other types of vehicles; that is easy to install; will retrofit to any standard golf cart roof; that does not interfere with the parking and storing profile (i.e. are sized to fit within the perimeter of the vehicle roof when in the closed position) of a fleet of vehicles; is easily opened and closed from the rain and sun shield base to provide the vehicle user with added sun and rain protection when in use; has side walls that are perpendicular with the plane of the roof and permits a user to easily extend and collapse the side walls to pop-up and collapse the shelter based on the roof.

SUMMARY

An apparatus and method for implementing a vehicle sun and rain shield that converts to a pop-up sheltered compartment. The apparatus semi-permanently attaches to the roof of any vehicle. The device is easy to install and does not interfere with the parking and storage profile of the vehicle. The device is sized to fit within the perimeter of any vehicle roof when deployed. The device is easily opened and closed to provide added sun and rain protection. The device has moveable panels that extend beyond the vehicle roof to provide sun and rain protection. The moveable panels deflect in response to contact. The moveable panels also lock in a position perpendicular with the plane of the roof to provide the pop-up sheltered compartment. The sheltered compartment is useful for storing items or providing temporary shelter for users.

It is to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise. Further, the invention presented herein may be described in terms of functional block components and processes, which may be realized in a variety of different forms to perform the specified functions and processes.

DETAILED DESCRIPTION

Figure 1:
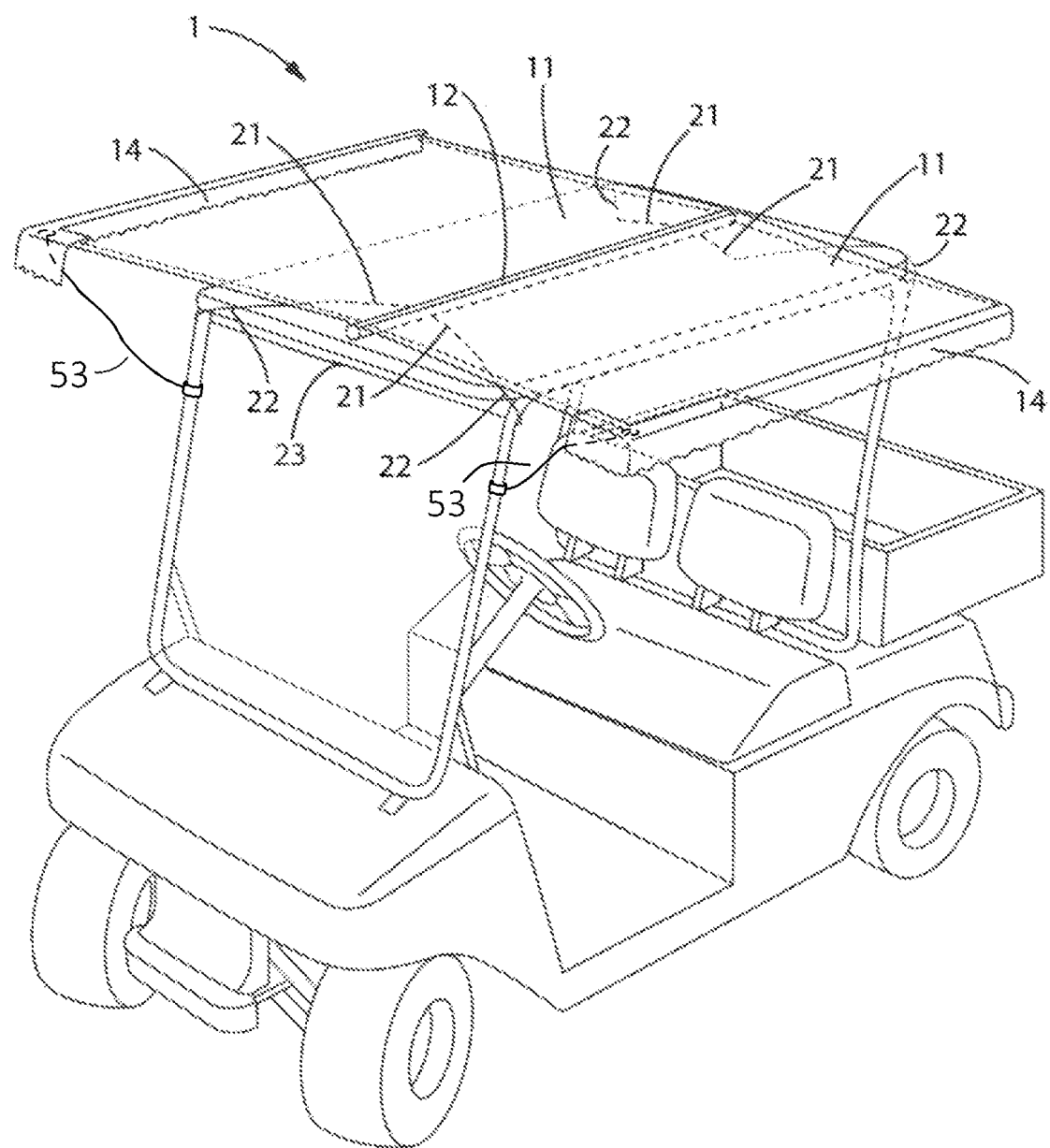
FIG. 1 is a perspective view of the extended portable device attached to a golf cart according to selected embodiments of the current disclosure.

In one embodiment of the disclosed device 1, as shown in FIG. 1, the following components are employed: a removable cover 11 that provides the device's sun and rain protection; a main support rod 12; and a valance 14 that hangs down along the edges of cover 11. When positioned on a golf cart, the cover has arms that extend outward and wider than the sides of a golf cart and front and rear ends that can reversibly face in the direction of the front and rear end of the golf cart. The cover 11 can be of any material, such as canvas, nylon, polyester, cotton, linen, tencel, hemp, or any synthetic or natural fiber. In one embodiment, the cover material is treated to be waterproof. In another embodiment, the cover may be washable. In one embodiment, nylon or polyester is used because of its durability and low weight. In one embodiment, the cover 11 is a rectangle of approximately 84 to 96 inches wide from side to side and 44 inches long from front to back (with directional references based on the position of the cover when installed on a golf cart). The roof of a typical two seat golf cart is approximately 48 inches wide and 60 inches long. In one embodiment, of the device, the cover 11 is wide enough to extend 18 to 24 inches out from each side of the golf cart roof. In another embodiment, the cover 11 is up to 120 inches wider than each side of the golf cart's roof. In one embodiment, the cover 11 is between 42 and 46 inches long, the approximate length of a large golf umbrella. In another embodiment, the cover 11 is the approximate length of a golf cart's roof. The main support rod 12 can be a rod or pipe and can be made of metal, plastic, fiberglass, composite or other suitable light weight and strong material. The main support rod 12 can be held in place by straps, clamps, suction pads, suction cups or other suitable fasteners to hold the main support rod 12 from sliding on the roof of the golf cart.

The main support rod 12 bifurcates the width of the cover. In one embodiment, the main support rod 12 is located exactly halfway between the extending sides or width of the cover 11. In one embodiment, the extending ends of the cover 11 have a 0 to 12 inch valence 14 that hangs freely from the extending ends of the cover 11 to provide additional sun and rain protection to the golfers in the cart. In another embodiment, that portion of the cover 11 that extends out from the sides of the golf cart's roof also has a 0 to 12 inch valence that hangs down from the front and rear ends of the cover 11. In another embodiment, there is a 0 to 36 inch valence that hangs vertically from the outer perimeter of the cover. In one embodiment, the valence hangs vertically from the cover only along the sides of the cart. In another embodiment, the valence hangs vertically from the cover along the sides of the cart and partially along the front side of the cart. In another embodiment, the valence is attached to the cover along the entire perimeter of the cover. The retaining lines 53 secure the device 1 to anchor points to improve stability.

Figure 2:
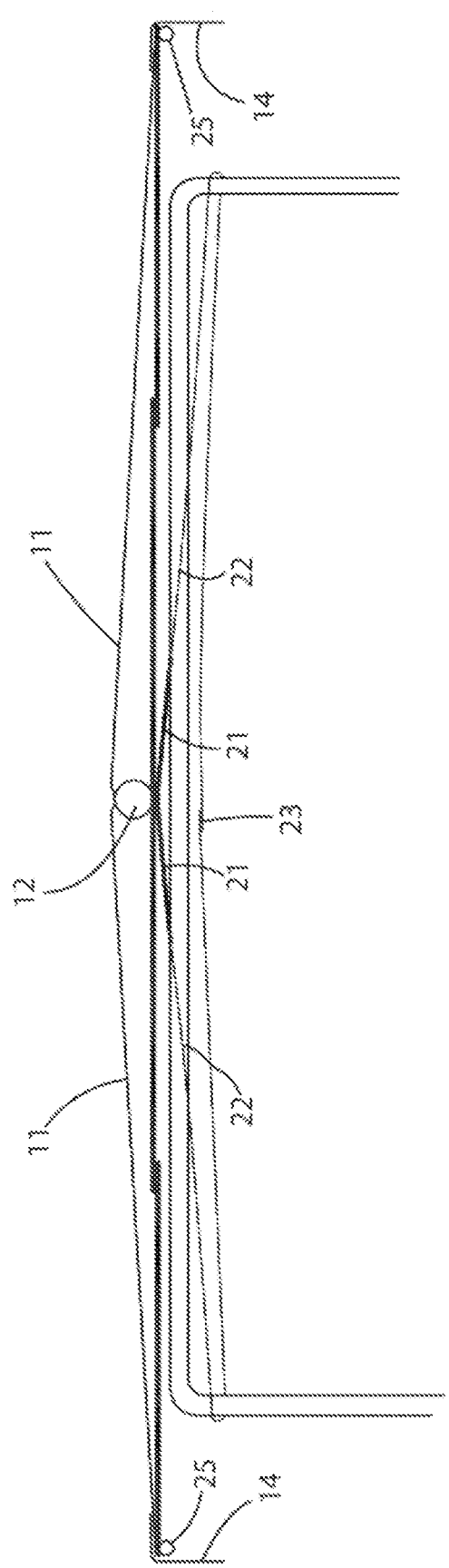
FIG. 2 is a rear plan view of the extended portable device according to selected embodiments of the current disclosure.

In one embodiment, of the disclosed device 1, as also shown in FIG. 2, the following additional components are employed: stabilizer arms 21 supporting the main support rod 12; straps 22 attached to the stabilizer arms 21, the stabilizer arms 21 having one end attached to the main support rod 12 and an opposite end with Velcro, metal or plastic snap, plastic side release, metal slide/D-ring release or other suitable fasteners 23 on the straps 22 that connect the straps 22 together. In one embodiment, two stabilizer arms 21 are attached to main support rod 12 by a mechanical fastener such as but not limited to a screw, pin, pivot, bracket, swivel bracket or other connector (not shown). For example the connector may be the same type of connector as connector 15 or connector 26, described at least with reference to FIG. 3, or a different type of connector known to those of ordinary skill in the art. In one embodiment, the fastener for the stabilizer arms allows the stabilizer arms to rotate substantially in the plane of the roof from a position parallel to the main support rod to a position perpendicular to the main support rod. Each stabilizer arm 21 may be attached at one end to the connector (not shown) in such a way that the stabilizer arms can rotate at least 90 degrees on the connector. In another embodiment, at least one stabilizer arm 21 is attached to the main support rod 12 at each connector, each stabilizer arm 21 being attached at its center to the connector. In one embodiment, the device has four stabilizer arms; two on each side of the main support rod connected to the main support rod which is the center point of the stabilizer arms. One end of each of the four stabilizer arms 21 are attached to the main support rod by rotatable mechanical fasteners. In an embodiment with three connectors, six stabilizer arms can be used. In one embodiment, the device has two stabilizer arms 21, and each stabilizer arm 21 connects approximately halfway down its length to connector 13. In such an embodiment, each arm rotates around the connector. In another embodiment, the device uses a non-swivel bracket that allows the stabilizer arms to rotate without moving the bracket. In another embodiment, the device uses an attachment that is not a bracket to connect the stabilizer arms to the main support rod.

Figure 3:
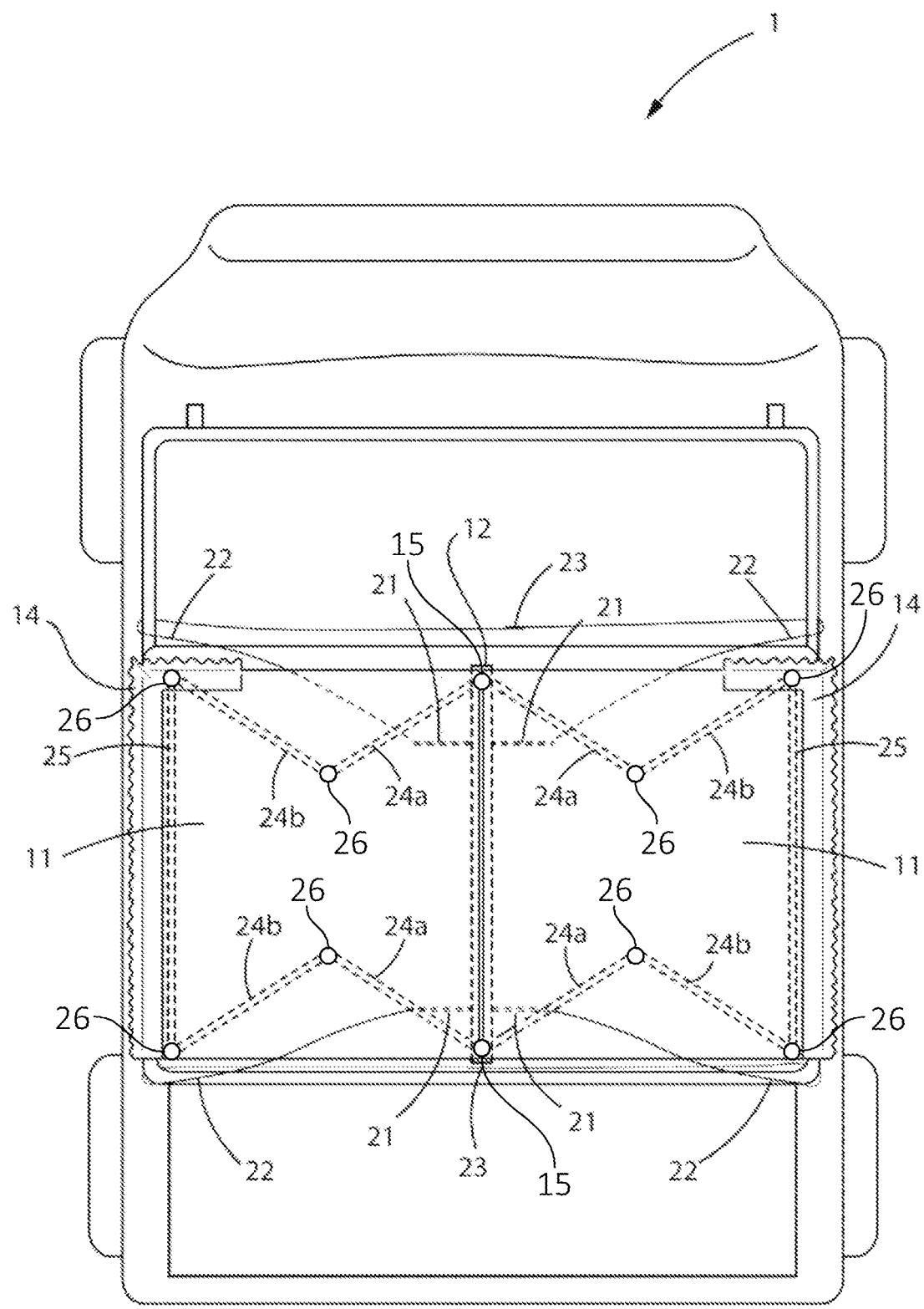
FIG. 3 is a top plan view of the partially retracted portable device according to selected embodiments of the current disclosure.

In the embodiment of FIG. 3, accordion-like extension arms 24 also attach to the main support rod 12 using fasteners similar those used to attach the stabilizer arms to the main support rod. In one embodiment, these are mechanical fasteners such as but not limited to hinge pins with retaining rings, screws, pins, pivots, brackets, swivel brackets generally referred to as connectors 15. In one embodiment, the accordion-like extension arms 24 attach to the same connectors on the main support rod 12 as the stabilizer arms 21. Each extension arm 24 is made of a light weight but strong rod or pipe that is generally of a smaller diameter than the main support rod 12. In one embodiment, two extension arms 24 attach to each connector 15 and extend in opposite directions. In such an embodiment, the extension arms have an inner segment 24a, an outer segment 24b, and a perimeter support rod segment 25, each segment having a proximal and distal end; wherein the proximal end of the inner segment is attached to the lower side of the main support rod and the distal end of the inner segment 24a is connected to the proximal end of the outer segment 24b and the distal end of the outer segment 24b is connected to the perimeter support rod segment 25 for each of the at least two extension arms 24. The perimeter support rod segment 25 can attach to the outer segment 24b by a connector 26, which can be the same type of connector as connector 15 or a different type of connector known to those of ordinary skill in the art. In another embodiment, a single extension arm (not shown) attaches to each connector 15 at the arm's center. In one embodiment, the extension arms 24 are the same diameter and construction as fiberglass tent poles. In another embodiment, the extension arms 24 are fiberglass tent poles. In one embodiment, the extension arms 24 attach to the main support rod 12 by bushings or bearing hinge pins or rivets. The cover 11 is attached using fasteners to the extension arms 24 so that the cover 11 becomes taut when the extension arms 24 are extended.

In one embodiment, the stabilizer arms 21 can, optionally, extend at an angle of between 10 and 25 degrees downward from the main support rod 12 to hold the main support rod 12 above the roof of the golf cart. In such an embodiment, this provides an angle to the cover so that, when extended, the highest point of the cover 11 is along the main support rod 12 causing water to drain out from the center of the cover to the sides of the golf cart.

In one embodiment, as shown in FIG. 2, the extension arms 24 are attached to the underside of the main support rod 12 while the cover is attached to the upper side (the opposite side) of the main support rod 12. This configuration also creates a pitch or angle to the top of the cover 11 so that water will drain away from the main support rod 12. This configuration also allows the extension arms 24 to be on a single plane so that they can fold and unfold easily. In another embodiment (not shown), the extension arms angle upward from the main support rod 12 or from the edge of the golf cart roof to allow additional standing clearance underneath the ends of the cover 11 overhanging the sides of the golf cart. In such an embodiment, the device would channel water toward the center of the cover 11 and off the back of the golf cart. In another embodiment, the device would channel water toward the perimeter support rod segment 25 which is configured to collect and direct water off either the back or front of the golf cart depending on the orientation of the device on the golf cart roof. In another embodiment, the perimeter support rod segment is configured as a groove, half circle or gutter to channel water from the sides of the cart to the back or front of the cover.

As further shown in FIG. 2, each stabilizer arm 21 has at least one strap 22 attached to it. The straps are of sufficient length to wrap around the sides of the golf cart roof and fasten together on the underside of the golf cart roof. In one embodiment, the straps are adjustable in length. In one embodiment, each strap 22 has a fastener on at least one end. In at least one embodiment, each strap 22 has a hook and loop closure on its loose end. Any type of fastener or attachment closure, such as Velcro, clips, or clip buckles, can be used on the straps 22 so long as the attachment closure can fasten the loose ends of the straps 22 together. In one embodiment, the stabilizer arms 21 can be held in place by straps, clamps, suction pads, suction cups or other suitable fasteners to keep the main support rod 12 from sliding away from the middle of the roof of the golf cart. In one embodiment, a single adjustable strap 22 is attached to a single stabilizer arm 21 on one end, wrapped around the golf cart roof and attached to the opposite of the single stabilizer arm 21 (embodiment not shown).

In an embodiment not shown, the extension arms 24 can be extended partway so the cover does not hang over the sides of the cart or, in another embodiment, overhangs less than at full extension.

As shown in FIG. 3, in one embodiment, the cover 11 is held in place across the golf cart's roof by a main support rod 12 that is approximately the same length as the cover 11. In one embodiment, the main support rod 12 is longer than the cover 11. The main support rod 12 has at least two attachment points for stabilizer connectors 15. In one embodiment, the stabilizer connectors 15 are positioned toward the ends of the main support rod 12. One stabilizer connector 15 can be positioned toward the forward end of the main support rod 12 and a second stabilizer connector 15 is positioned between 6 inches and 24 inches from the rear end of the main support rod 12. In another embodiment, the stabilizer connectors 15 are positioned at an equal distance close to the ends of the main support rod 12 so the device has a universal front and rear orientation. The device can have stabilizer connectors 15 on the main support rod 12, which can rotate at the connectors 15 on main support rod 12 so that they are parallel to the main support rod 12 requiring less space for storage when the device 1 is removed from a golf cart.

In one embodiment, when the device is fully retracted it approximates the size of a large golf umbrella, having dimensions of approximately between 2 and 3.5 inches in diameter by approximately between 42 and 46 inches in length. In one embodiment, the device is designed to fit into the umbrella tube, slot, compartment or holder of a golf bag having a diameter of between 2 and 4 inches. In another embodiment, the device is between 0 and 144 inches in length to accommodate golf carts with a carrying capacity larger than two passengers.

The device is easy to deploy and use. The retracted device is placed on top of the roof of a golf cart. The stabilizer arms 21 are rotated to be perpendicular to the main support rod 12 and oriented underneath the main support rod 12. The main support rod 12 is placed on top of the golf cart's roof with the stabilizer arms 21 touching the roof. The main support rod 12 has a front end and a rear end. The front end of the main support rod 12 faces the general direction of the front of the golf cart and the rear end faces the general direction of the rear of the golf cart. The device can be positioned halfway between the sides of the roof of the golf cart (centered) and, in one embodiment, is supported by the stabilizer arms 21 so that the cover 11 only contacts the outside edge of the roof of the golf cart. When the device is positioned on the golf cart roof and is stabilized by the stabilizer arms 21, then the straps 22 are dropped over the sides of the golf cart's roof and passed underneath the golf cart's roof. The straps 22 connect to each other under the golf cart's roof by the fasteners 23 on the free ends of the straps 22.

In one embodiment, the free end of one strap 22 has both hook and loop Velcro portions on it and the end of the Velcro strap 22 passes through a looped end of the non-Velcro strap 22 on the opposite side of the roof. The Velcro strap 22 then folds on itself, fastened by the Velcro so that the two straps remain firmly attached to one another under the roof of the golf cart. In another embodiment, any suitable fastener can be used to attach the free ends of the straps 22 under the golf cart roof. For example, suitable fasteners can be buckles, side release buckles, magnetic release buckles, cams, cam buckles, strap adjusters, center release buckles, breakaway buckles, ratchets, ratchet joints, snaps, rivets, and clasps. In another embodiment (not shown), a strap having a looped end or other suitable fastener wraps under the golf cart roof and attaches to a hook or other corresponding fastener to hold the device securely to the golf cart roof.

Once the device is positioned and fastened to the golf cart roof, then the extension arms 24 can be lengthened until the cover is at the desired length or taut. In one embodiment, the extension arms 24 include a spring engaged locking mechanism to keep them in the extended position. In another embodiment, the locking mechanism has a push button ratchet joint that provides various locking positions so that the cover can be retracted and extended to various widths between fully retracted and fully extended, depending on user preference.

The device can be easily removed from a golf cart. In an embodiment with Velcro strap fasteners, extension arms 24 are fully retracted and the stabilizer arm 21 straps 22 are unfastened. Then the stabilizer arms 21 are rotated parallel with the main support rod 12 for storage. Once the cover 11 is completely retracted or crumpled to its fully retracted position (it will crumple for storage as the extension arms 24 retract), the straps can be wrapped around the retracted device to hold the cover 11, folded stabilizer arms 21, and folded extension arms 24 tightly against the main support rod 12. When fully retracted, the device can fit into a standard umbrella pocket on a golf bag for storage.

In one embodiment, the stabilizer arms 21 can be omitted to reduce the size and weight of the device. In another embodiment, the extension arms 24 and the stabilizer arms 21 can be of a unitary construction to reduce the number of moving parts on the device.

In another embodiment, the device can be semi-permanently fixed to the roof of a golf cart using mechanical fasteners such as but not limited to screws and bolts. In the semi-permanent embodiments, for example, the accordion like extensions of the portable device which is covered in light weight material can be used but alternatively replaced with hardtop extensions or flexible panels such as but not limited to a clam shell or flip top designs that when stowed fit within the frame of a golf cart roof but when open provide extended rain and sun protection to the golf cart users. Such embodiments would no longer fit in the umbrella pocket of a golf bag but are still considered portable as they can be attached or retrofit to any golf cart roof. They could remain on the golf cart roof or otherwise stored in close proximity to the golf carts themselves to attach as needed.

Figure 4:
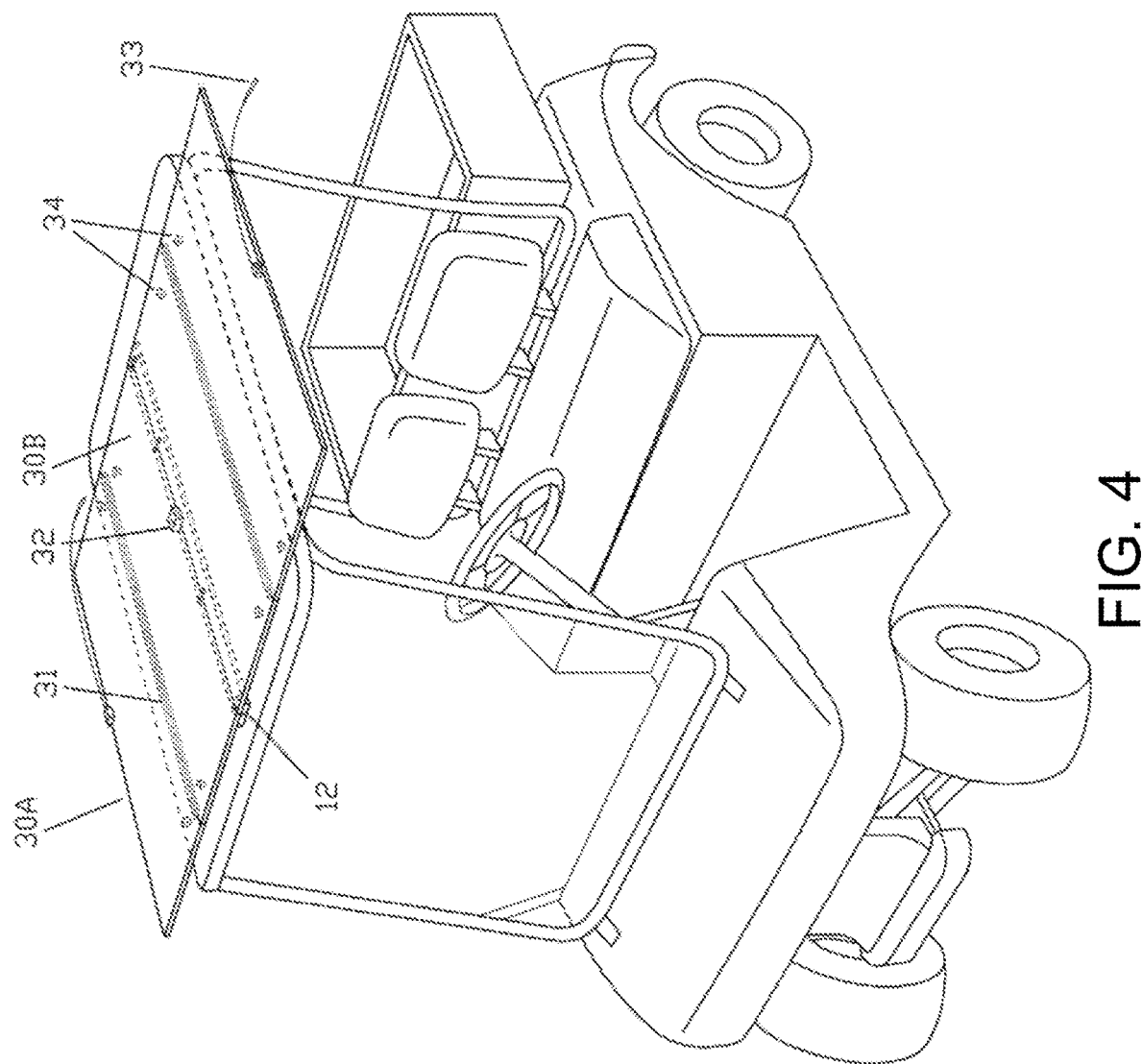
FIG. 4 is a perspective view of a folding embodiment of a device semi-permanently attached to a golf cart.

In one embodiment shown in FIG. 4, the embodiment is comprised of two identical sets of panels 30A and 30B that are stacked when stored or not in use. To use or deploy the device the panels can be unfolded to provide the sun and rain shade for each side of the golf cart. The panels 30A and 30B can be made of lightweight waterproof material such as but not limited to plastic, high impact polyethylene, fiberglass, composite material or other suitable light weight, waterproof and strong material. One edge of panel 30B is affixed to the main support rod 12, which is securely attached to and extends along the center and top of the golf cart's roof from front to back of the golf cart roof. The other edge of panel 30B is attached to panel 30A using a flexible hinge 31. In the embodiment of FIG. 4, the two identical sets of panels 30A and 30B are connected to each other using, for example, a single flexible hinge that extends substantially along the joint between the panels. In an alternate embodiment, a plurality of smaller hinges is spaced-apart along the joining edges of the two panels. In the retracted position, panel 30A is folded back or stacked on top of panel 30B and remains secured to the main support bar such as by a central clasp 32. In the embodiment of FIG. 4, a single central clasp 32 is shown. In another embodiment, a clasp (not shown) is located on the front or rear edges of the main support bar or on the front edge of the golf cart roof for ease of accessing the clasps from the front and rear of the cart when deploying the panels in the extended position. The clasps can be any type of spring-loaded or non-spring-loaded mechanical or magnetic clasps known to those of ordinary skill in the art.

In one embodiment, a single central clasp can have multiple mating clasps attached to multiple panels to secure the panels in the closed position. A draw-line 33 is shown attached to a mating clasp for a single central clasp 32 which is attached to the outer edges of panels 30A to assist the user in deploying the panels to the extended position. In one embodiment, a plurality of flexible grommets 34 are spaced-apart near the hinges and attached to the side of panels 30A and 30B that come in contact with the roof of the golf cart to prevent the panels from directly contacting the topside of the golf cart roof either when the panels are retracted or extended to prevent scratching. The flexible grommets also provide stability, shock absorption, noise reduction and to cushion the panels as the golf cart moves across the terrain whether in the extended or retracted position. In one embodiment, the grommets 34 are symmetrically spaced apart. In another embodiment, the grommets 34 are asymmetrically spaced apart. In another embodiment, the grommets 34 are waterproof, weatherproof and made of material such as but not limited to rubber or plastic.

Figure 5:
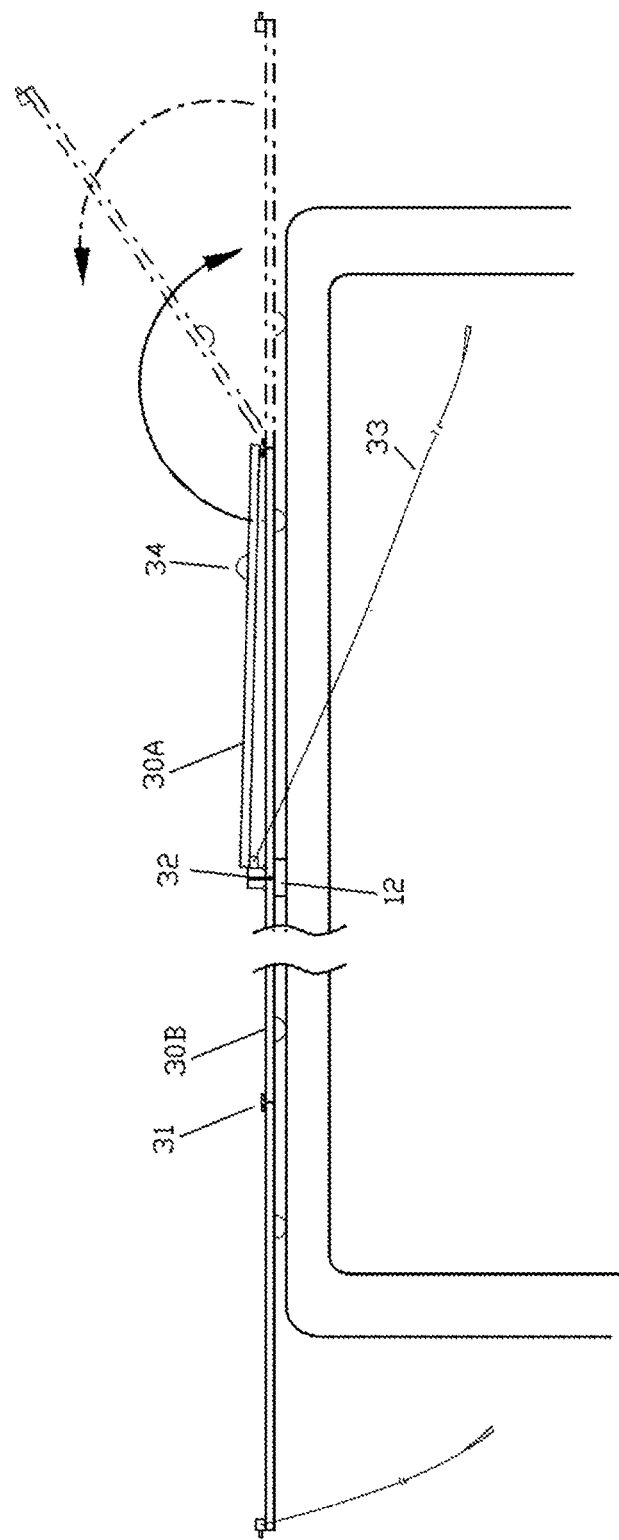
FIG. 5 is a front or rear side view of the embodiment shown in FIG. 4 attached to a golf cart roof with one side of the embodiment shown in the extended or open position and the other side in the retracted position with dashed lines showing the movement of that one side to the extended position during use.

In reference to FIG. 5, one side of the embodiment of FIG. 4 is shown in the retracted position and secured to the main support rod 12 at the clasp 32. In dashed lines, the panel 30A is shown in the extended and partly extended position to show how the panel folds along the hinge 31 when being deployed or retracted. The embodiment of FIG. 4 shows the panels 30A and 30B are of the same width and length dimensions so that in the retracted position; the panels substantially overlap and are contained within the perimeter of the golf cart roof. The width dimension of the panels is selected such that in the extended position, the panel 30A extends over the edge of the roof to the desired level when in use. In one embodiment, the panels extend, when deployed, beyond the width of the golf cart roof up to 24 inches. In one embodiment, the panels extend beyond the width of the golf cart roof up to 120 inches.

In an embodiment not shown the hinge 31 may be located closer to the left and right edges of the golf cart's roof. In an illustrative example the width of panel 30A would only need to be sized to provide the extent of shading desired. In this embodiment, the width of panel 30B would be larger than panel 30A since the additional width is necessary to reach the main support rod 12 that is attached to the center of the golf cart's roof. In this embodiment the securing clasps 32 may be located closer to the center of panel 30B to match up with the mating clasps on the outer edges of panel 30A.

In an embodiment not shown a telescoping or sliding implementation of the current invention is contemplated. In this embodiment, panels may move horizontally relative to the plane of the golf cart's roof within housing cavities. The panels have a proximal edge, and a perimeter edge. The panels can be made of lightweight waterproof material such as but not limited to plastic, high impact polyethylene, fiberglass, composite material or other suitable light weight, waterproof and strong material. The housing cavities may be secured centrally to the main support rod 12 or directly to the top surface of the golf cart roof. In this embodiment the top surface of the golf cart's roof may form the bottom of the housing cavities so that essentially the housing cavity is an open frame to house the shield panels. In one embodiment, the housing cavities may be secured to lateral rails that guide the panels as they are extended and retracted. The lateral rails may be located at the front and rear of the golf cart roof and secured to the main support rod 12 or alternatively semi-permanently attached directly to the top surface of the golf cart roof.

Alternatively, the lateral rails may be the front and rear side of the housing cavities. The lateral rails may be semi-permanently attached to the roof of the golf cart. In another embodiment, the housing cavities are semi-permanently attached closer to the edges of the golf cart's roof to shorten the width of the panels required to reach the desired level of rain and sun protection when extended.

A stop block alternatively called a retaining arm may be secured to one or more of the panels to prevent the panels from falling out of the housing cavities. In one embodiment, an arm guide may be notched out of the side edges of the housing cavity and the retaining arm slides back and forth within the arm guide to prevent the panels from sliding out of the housing cavities when the panels are placed in the extended position. In one embodiment, a hand grip section of the panels' outer edges is made to provide a gripping point to extend and retract the panels from the housing cavities. However, any type of known handle design could be used to facilitate movement of the panels within the housing cavities. In other embodiments, known rail guides, such as those used for guiding cabinetry drawers could also be used to control the movement of the panels into and out of the housing cavities. In another embodiment the housing cavity comprises only the rails themselves to hold the panels.

In an embodiment not shown an implementation may provide for rain and sun shield device having a pair of housing cavities, each cavity having a rectangular shaped frame with an open top and bottom, a back, an open distal end and a set of lateral slide rails. The lateral side rails form the right and left sides of the cavities. In this embodiment, cavities are nested back to back within the limits of the golf cart roof. The cavities are semi-permanently attached to the upper surface of the golf cart roof and a pair of rectangular panels is inserted into each of the housing cavities. The panels can be manually deployed by a user so that the panels lie partly on the golf cart roof and extend beyond the right and left sides of the golf cart roof. In this embodiment, the device also has at least one pair of detachable retaining lines with two ends, whereby one end is permanently attached to the front edge of each panel and the other end is optionally, temporarily or as needed attached to an anchor point located on the front of a golf cart frame located below the cart roof to anchor the panels in the deployed position. In this embodiment the panels can be deployed up to about 24 inches past the right and left sides of the golf cart roof. In this embodiment, the device also has a retaining arm secured to each panel and located within an arm guide notched out of the inside and outside surfaces of the slide rails of each housing cavity and a central grip notch located near the perimeter edge of each panel. In this embodiment, the device also has a plurality of flexible grommets attached to the bottom surface of each of the panels, a wiper blade attached to the bottom proximal surface of each panel to keep rain from getting under the shield and draining at the sides of the golf cart roof; and a second anchor point located on the top front edge of the golf cart roof or slide rail with a mating clasp attached to the front edge of each panel.

In an embodiment not shown a folding implementation of the device may comprise two main support bars secured near to the left and right perimeter of the golf cart's roof. Each of the two shield panels may be attached on the inside edge to hinges. The other sides of the hinges may be secured to each of the two main support bars. In this embodiment the hinges may be 180-degree piano hinges that extend substantially along the inside edge of the panels. However, in other embodiments, a plurality of evenly-spaced apart smaller hinges may be used. In the retracted position, the shield panels may fold about 180-degrees over the hinges toward the central part of the top surface of the golf cart's roof. The panels may be made of lightweight waterproof material such as but not limited to plastic, high impact polyethylene, fiberglass, composite material or other suitable light weight, waterproof and strong material. In one embodiment, a retaining line 53 may be attached on one end to the front edge of each shield panel, depicted at least by FIG. 1 for example. The other end of the retaining line 53 may be optionally, temporarily or as needed secured to the front of each forward cart frame at some distance below the cart's roof section at an anchor point to stabilize the panel when the golf cart is in use. In other embodiments, one side of the 180-degree hinges are semi-permanently attached directly to the top side of the golf cart's roof and do not require the two main support bars extending along the side edges of the golf cart's roof. In one embodiment, grommets 34 (shown at least by FIGS. 4 and 5 for example) may be placed along the full length of the panel front to back to prevent the panels from having direct contact with the golf cart roof.

Figure 6:
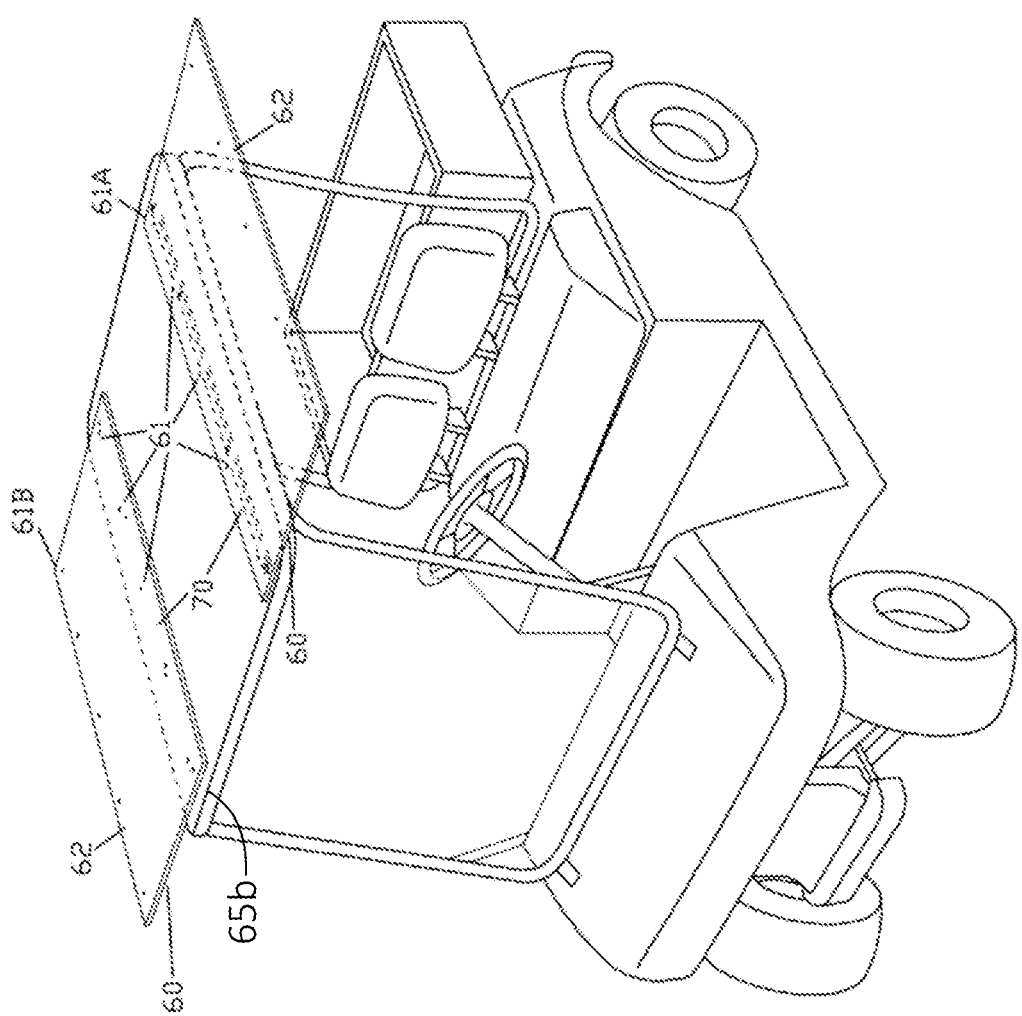
FIG. 6 is a perspective view of a retractable and flexible embodiment of the device in the fully extended or deployed position having collapsible ribs in which the panels are semi-permanently attached to a golf cart.

In reference to FIG. 6, an embodiment of the device is shown comprising two main support bars 70 semi-permanently attached to the golf cart roof near the left and right side edges of the golf cart's roof and two shield panels 60 each comprising a flexible material covering a plurality of rigid ribs 61 forming a rib array; said plurality of rigid ribs 61 having an interior or proximal side 61A and an exterior or distal side 61B. The interior side 61A of each of the plurality of rigid ribs 61 is attached to the main support bar 70. The exterior side 61B of each of the plurality of rigid ribs 61 extends away from the sides of the golf cart when the shield panel 60 is in the extended position; and the exterior side 61B of each of the plurality of rigid ribs 61 is attached to a perimeter support rod 62. Each of the rigid rib elements are connected to one of the main support bars 70 and the perimeter support rod 62 using swivel pin joints 65b that allow the rigid rib elements to rotate relative to each other. In FIG. 6 one swivel pin joint 65b (also depicted at least by FIGS. 7 and 8 for example) is disposed at one end of one of the main support bars 70. An exemplary implementation may comprise four swivel pin joints 65b. Two of the four swivel pin joints 65b may be disposed at opposite ends of one of the two depicted main support bars 70. The other two of the four swivel pin joints 65b may be disposed at opposite ends of the other of the two depicted main support bars 70. A flexible and opaque fabric overlay material may be secured over the rib array to provide the rain and sun shield. In another embodiment the flexible and opaque fabric overlay material may be secured over the rigid ribs 61, the perimeter support rod 62 and the main support bar 70.

Figure 7:
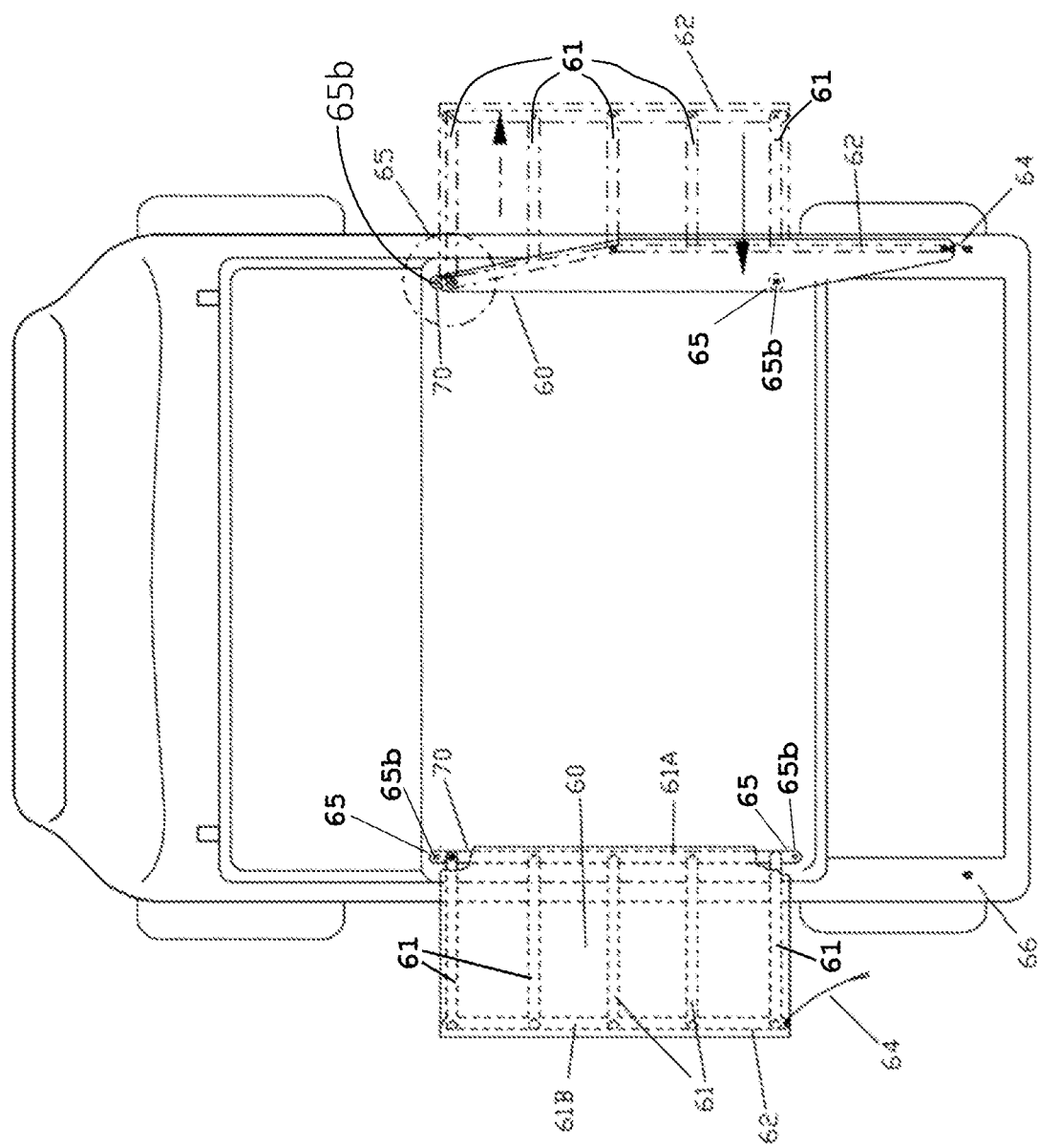
FIG. 7 is a top plan view of the embodiment of FIG. 6 showing one side in the fully extended position and the other side in a horizontally flexed and closed position with dashed lines showing that side's deployed position when not being horizontally flexed by an external force. This drawing also shows a dashed circle callout around one of the swivel hinges of one side that is shown in an exploded view in FIG. 8.

In reference to FIG. 7, the right-side shield panel 60 is shown in an exemplary retracted position in solid line and the extended position in dashed line. In the retracted position, the perimeter support rod 62 is pulled toward the back of the golf cart such that the shield panel 60 is collapsed within the roof line of the golf cart. Alternatively, this embodiment can be retracted when the perimeter support rod 62 is pulled toward the front of the golf cart by the same mechanism. A semi-detachable strap 64 having two ends is permanently attached on one end to the rear edge of each panel 60 and on the other "free" end can be temporarily attached to an anchor point 66 on the rear of the golf cart frame to hold the panel 60 in the retracted position when the device is not being used. In another embodiment the removable strap 64 having two ends is permanently attached on one end to the front edge of each panel 60 and on the other free end temporarily attached to an anchor point 66 on the front of the golf cart frame to hold the panel 60 in the retracted position when the device is not being used. The anchor point 66 can be a fastener such as but not limited to a loop, hook, snap, Velcro, buckles, side release buckles, magnetic release buckles, cams, cam buckles, strap adjusters, center release buckles, breakaway buckles, ratchets, ratchet joints, snaps, rivets, and clasps that allows the strap to attach to the anchor point.

In one embodiment, the free end of one strap 64 has both hook and loop Velcro portions on it and the end of the Velcro strap 64 passes through a looped end of the non-Velcro strap 64 on the opposite panel. The Velcro strap 64 then folds on itself, fastened by the Velcro so that the two straps can also remain firmly attached to one another on top of the roof of the golf cart when the device is not in use. In another embodiment, any suitable fastener can be used to attach the free ends of the straps 64 on top of the golf cart roof. Once again, suitable fasteners can be buckles, side release buckles, magnetic release buckles, cams, cam buckles, strap adjusters, center release buckles, breakaway buckles, ratchets, ratchet joints, snaps, rivets, and clasps. In another embodiment (not shown), a strap having a looped end or other suitable fastener wraps under the golf cart roof and attaches to a hook or other corresponding fastener to hold the device securely to the golf cart roof.

A rotatable compression spring 65 is attached to the front or back swivel pin joint 65b of the proximal also called interior side 61A of the plurality of rigid ribs 61. When the device is retracted, and one end of the strap 64 is anchored to the front or rear of the cart, the compression spring 65 is compressed by the rotation of the swivel pin joint 65b to which it is attached. When the strap 64 is detached from the anchor, the compression spring 65 releases the stored force and stretches the rib array and flexible overlay material out into the extended position. In the embodiment of FIG. 7, four rotatable compression springs 65 are shown attached to the respective swivel pin joints 65b of the internal ribs. However, in other embodiments, additional compression springs 65 may be placed on respective additional swivel pin joints 65b in the rib arrays to provide additional forces to automatically extend the shield into position for use. Another benefit of the compression springs 65 placed on the swivel pin joints 65b is realized when the extended shield contacts external forces during motion of the golf cart. For example, if the shield contacts a low-hanging tree branch or the side of a tunnel, the shield will deflect toward the front or rear of the cart depending on the direction of the pressure and then automatically return to the extended position when the cart clears the obstruction. In other words, the compression springs 65 are at rest when the panels 60 are fully deployed and the rigid ribs 61 are in a configuration perpendicular to the main support bar 70 and the perimeter support rods. In the implementation depicted by FIG. 7 the main support bars 70 are semi-permanently attached to the roof and the compression springs 65 and swivel pin joints 65b are arranged between each main support bar and the respective panel 60, permitting the panels 60 to swivel using the swivel pin joints 65b.

Figure 8:
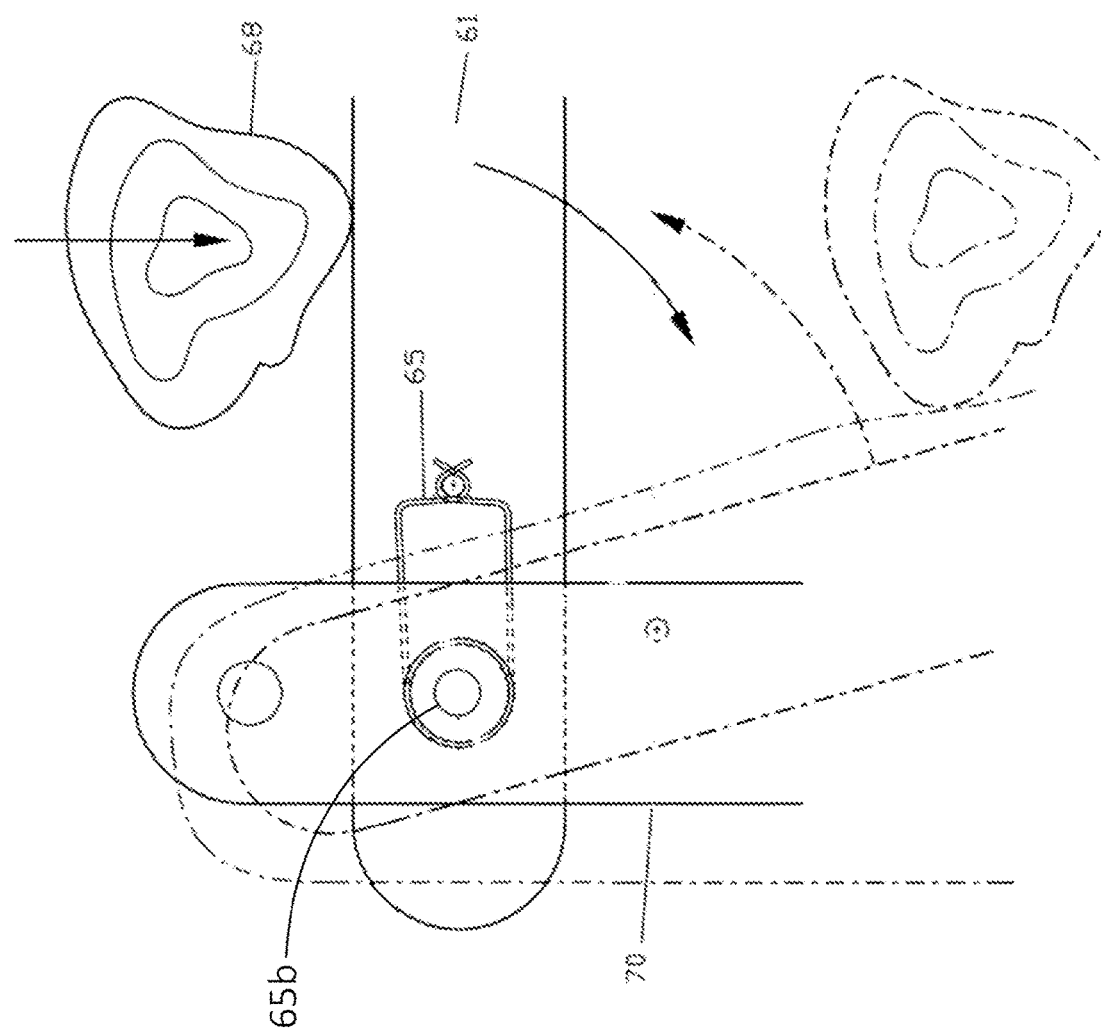
FIG. 8 is a top detail view of the dashed circle callout of FIG. 7 showing one of the swivel joints in solid lines at its open position and in dashed lines showing how the embodiment rotates when subjected to an external force and where a spring around the rotatable joint automatically returns the embodiment to the normally extended position when the external force is removed or is closed.

In reference to FIG. 8, an exploded view of one of the swivel pin joints 65b of FIG. 7 is shown. In the extended position, the plurality of rigid ribs 61 is perpendicular to the main support bar 70 and the perimeter support rod 62. An external obstruction 68, which represents an immovable object that contacts the shield during motion of the cart such as but limited to brushing up against a tree or the side of a building or even a person, causes each of the plurality of ribs 61 to rotate about the swivel pin joint 65b. One end of the compression spring 65 is anchored to the main support rod 70. The other end of the compression spring 65 is attached to the swivel pin joint 65b on at least one of the plurality of rigid ribs. As the rib rotates, a compressive force is stored in the spring. The deflected cross rib is shown in dashed line as it is rotated about the swivel pin joint 65b. Once the cart passes the obstruction 68, the torsional force stored in the compression spring 65 returns the cross rib to the perpendicular orientation.

In an embodiment not shown a folding implementation may comprise 180-degree hinges having two sides. The 180-degree hinges may be configured on one side directly and semi-permanently attached to the roof of the golf cart, and on the other side may be attached to the proximal side of each panel. In this embodiment, one or more matching clasp elements may be placed near the front and/or rear edges of each shield panel that fold into receiving clasps secured toward the front and/or rear of the cart roof such that the panels are held in place on top of the golf cart roof when not in use. The clasp elements may be mechanical, magnetic or other such styles known in the art. The number and locations of the securing clasps required to provide the desired level of panel security when stowed may vary, depending on factors such as the weight and dimensions of the shield panels and the profile of the golf cart's roof.

In an embodiment not shown a shield panels stowage and deployment implementation is contemplated. For example the left shield panel may be deployed in an extended mode while the right shield panel is stowed in a retracted mode. A long piano hinge or a plurality of smaller 180-degree rotating hinges may be semi-permanently attached on one side to the roof of the golf cart. The other side of the hinge may be attached to the lower surface of each support bar 70. In the retracted position, the shield panel may fold about 180-degrees over the hinges toward the central part of the top surface of the golf cart's roof. A semi-detachable retaining line may be attached on one end to the rear edge of each shield panel. The other "free" end of the retaining line may be attached to an anchor pin secured to the rear frames of the cart at some distance below the cart's roof section when the panels are in use. The semi-detachable retaining line may also be located toward the front edge of the shield panels and attached to a second anchor pin secured to the front frame section of the golf cart. Alternatively, the shield panels may be secured to both the front and rear frames simultaneously using multiple semi-detachable retaining lines and anchor pins or clasps in accordance with what has been described herein. In one embodiment, each panel may have an anchor point so that the lengths of the retaining lines are such that when in the stowed position, each free end is affixed to a corresponding anchor point on the other panel, securing the panels together. Alternatively the semi-detachable lines may attach together at their free end when in the stowed or closed position. In one embodiment, grommets 34 (depicted by at least FIGS. 4 and 5 for example) may be configured in the panels to prevent damaging the golf cart roof, based on placing the grommets 34 in the panels where the panels come in contact with the golf cart roof.

An exemplary shield device implementation may be configured to deflect in response to external force when deployed in an exemplary extended mode. For example the golf cart roof may be configured with two shield panels 60. The two shield panels 60 may be independently deployed to an extended position or stowed to a retracted position. In various scenarios the shield panels 60 may be in exemplary retracted, retracting, deploying, deployed, deflecting or deflected positions.

Each shield panel 60 may be independently deployed, retracted, or deflected, based at least on the deflecting shield design techniques disclosed herein. Each shield panel 60 may be configured to retract for storage to an exemplary shield panel 60 stowed position within the perimeter of the roof. The shield panel 60 may be extended to an exemplary deployed position. In the shield panel 60 deployed position, each shield panel 60 is configured in an open rectilinear position to lie partly on the golf cart roof top and extend beyond the golf cart roof side. In an illustrative example either of the two panels 60 may deflect to an exemplary deflected position in response to contact by a force. When deflected by a force the panels 60 may deflect from an open rectilinear position to an open deflected parallelogram position. In the open deflected parallelogram position the panel may lie at least partially outside the perimeter of the roof.

Each shield panel 60 may be configured to deflect in response to external force applied to the shield panel 60, based at least on the deflecting shield design techniques disclosed herein. For example, the shield panel 60 may deflect in the direction of force applied to the shield panel 60, and automatically return to an exemplary deployed position. Exemplary deflecting shield designs may use rigid ribs 61 with the rotatable compression spring 65 and swivel pin joint 65b implementation techniques disclosed herein with reference to at least FIGS. 6-8. In an illustrative example the shield panel 60 in a deflecting shield design may, in response to contact by a force, deflect from the open rectilinear position to the open deflected parallelogram position outside the perimeter of the roof, and automatically return to an exemplary deployed position when the contacting force is removed.

Each main support bar 70 may be vertically displaced from the golf cart roof by a spacing standoff. The spacing standoff may be configured with a swivel or bearing permitting the shield panel 60 to rotate. The spacing standoff may be any length useful to vertically displace the shield panel 60 from the golf cart roof, for example to assist drainage. Vertically displacing the main support bar 70 from the golf cart roof angles the shield panel 60 from the main support bar 70 downward toward each side of the golf cart roof. Angling the shield panel 60 from the main support bar 70 downward toward each side of the golf cart roof may assist draining rain water from the shield panel 60. The shield panel 60 may comprise one or more drain groove. The drain groove 76 may be a channel configured in the shield panel 60 edge to direct rain water from the shield panel 60. Each shield panel 60 may comprise a rib 61 and perimeter support rod 62 designs described herein at least with reference to FIGS. 6-8. Each exemplary shield panel 60 may be configured with an end cap. The end cap may be a plug or seal configured in the drain groove to prevent rain water draining from the drain groove end where the end cap is installed. The end cap may be configured with a tapered shape wider at one end of the end cap than the other end, to ease user installation or removal and help secure the end cap in the drain groove. The end cap may be installed in either end, or both ends, of the drain groove. For example, a user desiring to encourage rain water to drain away from equipment, such as golf clubs, stowed at the golf cart rear may install an end cap at the drain groove end disposed at the golf cart rear, to prevent drainage from the rear. A user desiring to encourage rain water to drain toward the golf cart rear may install the end cap at the drain groove end disposed at the golf cart front. An exemplary drain groove may be configured with multiple drain hole apertures. The drain hole apertures may increase the shield panel water draining efficiency based on increasing the surface area configured to direct water away from the golf cart roof. Some shield panel 60 implementations may omit the drain groove. Various drain groove implementations may omit any drain hole aperture.

Figure 9:
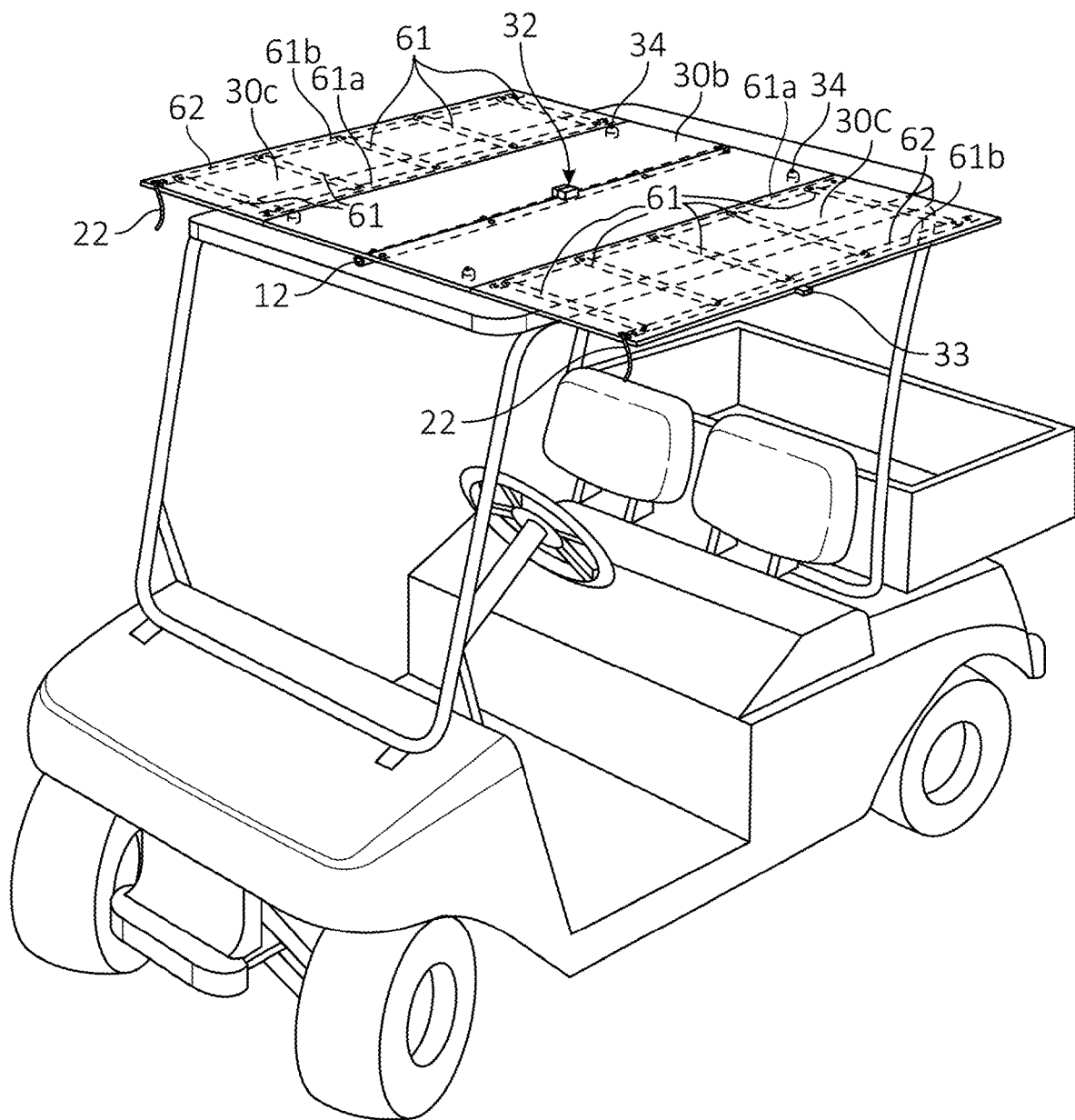
FIG. 9 is a perspective view of an exemplary implementation of the extended portable device attached to a golf cart according to selected embodiments of the current disclosure.

In reference to FIG. 9, an exemplary implementation of the extended portable device is depicted attached to a golf cart. The depicted vehicle may be any type of vehicle. The depicted device includes the panels 30c extended at least partially beyond the vehicle roof. In the depicted implementation each of the panels 30c includes a respective plurality of rigid ribs 61 and a perimeter support rod 62. The depicted plurality of rigid ribs 61 comprise an interior or proximal side 61a and an exterior or distal side 61b. The depicted panels 30b are secured by the central clasp to the main support rod 12. The main support rod 12 is securely attached to the top of the golf cart roof and extends substantially from front to back of the roof. The central clasp 32 secures one edge of panels 30b to the main support rod 12. A draw-line may be attached to the mating clasp 33 for the central clasp 32 to ease operation of the panels. In the depicted example the straps 22 may be attached to a hook or other such fastener to secure the device to the vehicle roof. The grommets 34 may be configured in the panels to protect the golf cart roof from damage by the panels.

Figure 10:
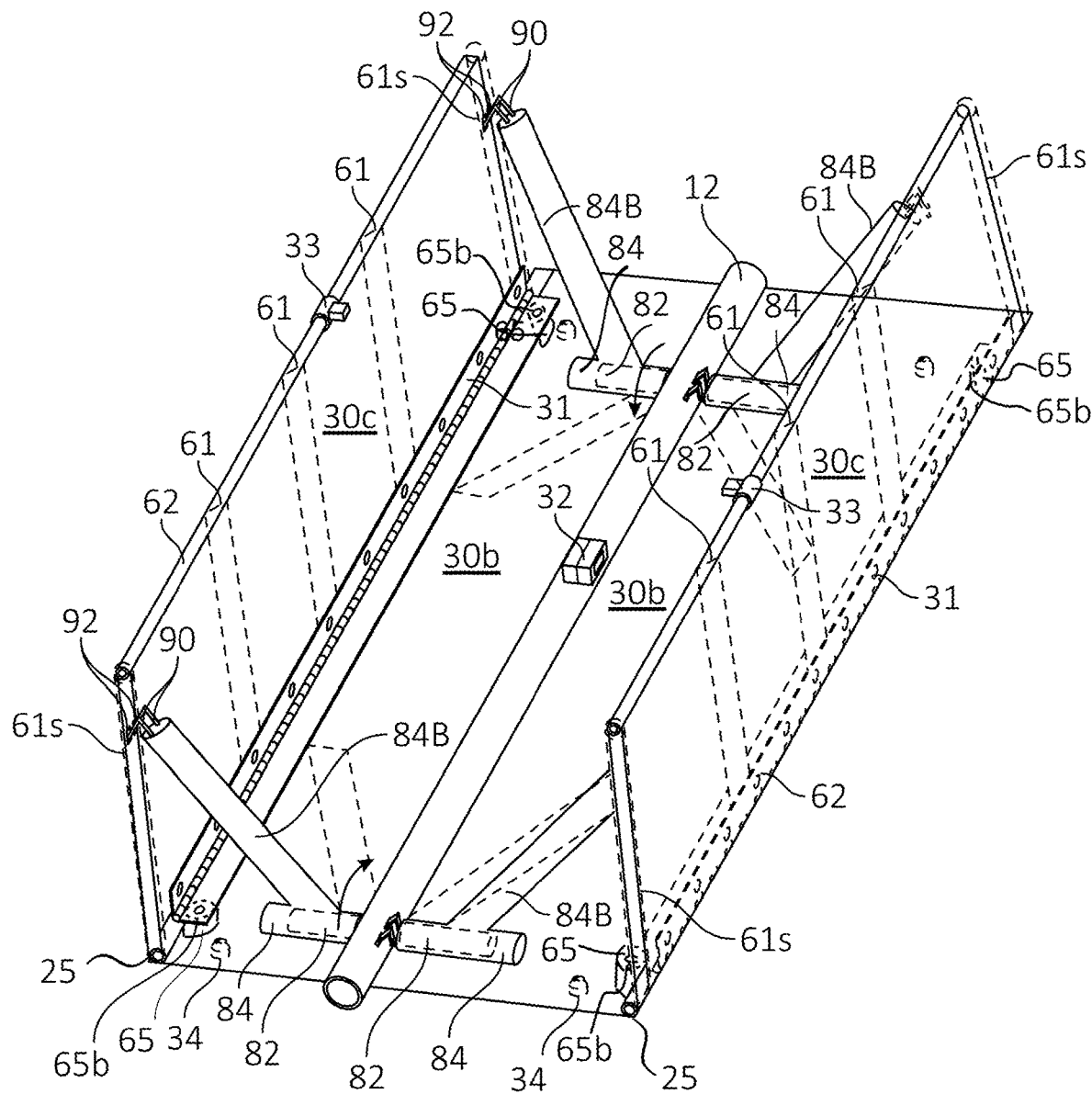
FIG. 10 is a perspective view of the device in an exemplary pop-up shelter configuration with panels locked in exemplary vertical deployed positions.

In reference to FIG. 10, the depicted device comprises the main support rod 12, two hinges 31, two immovable panels 30b and two movable panels 30c. The main support rod 12, the two hinges 31 and the two immovable panels 30b may be disposed along the top face of a vehicle roof toward the outside perimeter of the right and left side of the vehicle roof. The vehicle may be any type of vehicle. The two immovable panels 30b may lie in the plane of the roof or in a plane substantially parallel with the plane of the roof. The main support rod 12 may be disposed in the plane of the roof and may bifurcate the roof from front to rear.

With continued reference to FIG. 10, the main support rod 12 is configured with the four posts 82. In the illustrated example the posts 82 are within the respective securing sleeves 84. In the depicted implementation each post 82 of the four posts 82 is shown in dashed lines indicating the respective post is within the respective securing sleeve 84. In the illustrated implementation each securing sleeve 84 is in mechanical union with a respective support arm 84b. In the depicted implementation the longitudinal axis of each of the support arms 84b is disposed at a positive offset angle from 0 degrees up to 90 degrees relative to the longitudinal axis of the respective securing sleeve 84. The angle between the securing sleeve 84 and the respective support arm 84b may be any angle useful to securely support and stabilize the movable panels 30c. In the depicted implementation the longitudinal axis of each post 82 is disposed perpendicular to the longitudinal axis of the main support rod 12. In the depicted implementation the longitudinal axis of each of the posts 82 is disposed in the plane of the roof. A first end of each post 82 of the plurality of the posts 82 may be permanently attached to the main support rod 12. For example each post 82 may be welded to the main support rod 12. Each post 82 may be integral with the main support rod 12. The post 82 may be an elongated structure. The post 82 may be solid or hollow. The post 82 may be tubular, cylindrical or another shape. In any case each post 82 is fixed to the main support rod.

With continued reference to FIG. 10, each hinge 31 is disposed along the side edges of their respective panels 30b laid on the vehicle roof. The two movable panels 30c are connected to the respective hinges 31 disposed at respective side edges of the two panels 30b. The hinges 31 permit independently rotating each of the panels 30c from stowed positions disposed within the perimeter of and in the plane of the roof, to vertical deployed positions perpendicular to the plane of the roof. In the depicted example the panels 30c are locked in vertical deployed positions perpendicular to the plane of the roof. Each securing sleeve 84 of the plurality of securing sleeves 84 may fit over a respective plurality of post 82 second ends to rotationally couple or engage each securing sleeve 84 with the respective post 82. In this configuration each securing sleeve 84 may rotate about the longitudinal axis of the respective post 82.

In the implementation depicted by FIG. 10, each movable panel 30c of the pair of movable panels 30c is configured with compression springs 65 and swivel pin joints 65b as disclosed herein at least with reference to FIGS. 6-8 for example. When the movable panels 30c are not locked in vertical deployed positions the movable panels 30c may be rotated substantially 180 degrees from their stowed positions disposed within the perimeter of and in the plane of the roof using the hinges 31. In an illustrative example the pair of panels 30b and the pair of panels 30c comprise stackable panels. The hinges 31 permit rotating the unlocked movable panels 30c from their stowed positions stacked on the immovable panels 30b or vertical positions to extended positions disposed outward from the device as depicted for example by FIG. 9. When the movable panels 30c are not locked in vertical deployed positions and the movable panels 30c are rotated outward from the device as depicted for example by FIG. 9, the compression springs 65 and swivel pin joints 65b configured in the movable panels 30c enable the movable panels 30c to deflect when contacted by a force as disclosed herein at least with reference to FIGS. 6-8 for example. In the implementation depicted by FIG. 10 each of the swivel pin joints 65b and the compression springs 65 are arranged between one of the hinges 31 and a top surface of the respective immovable panel 30b. The swivel pin joint 65b is installed between the hinge 31 and the top surface of the immovable panel 30b. The hinge 31 may be secured to the immovable panel 30b using a bolt, screw or other fastener through a mounting hole or aperture in the hinge 31 or a weld at a mounting point in the hinge 31. In the implementation depicted by FIG. 10 each hinge 31 is secured to one immovable panel 30b through one mounting hole or aperture disposed at each end of the hinge 31. Each of the swivel pin joints 65b are installed between the hinge 31 and the immovable panel 30b with the axis of rotation of the swivel pin joint 65b colinear with the mounting hole or aperture in the hinge 31. The swivel pin joint 65b installed between the hinge 31 and the immovable panel 30b permits the unlocked movable panel 30c to deflect when contacted by a force in accordance with what has been disclosed with reference to at least FIGS. 6-8 for example. In the implementation depicted by FIG. 10 each movable panel 30c is shown configured with one piano hinge 31 that extends along the length of the outer edge of the depicted movable panel 30c. In such an implementation with one hinge 31 per panel one swivel pin joint 65b may be configured substantially at the outer corners of the movable panel 30c. In an implementation employing multiple individual hinges 31 configured along an edge of the movable panel 30c each individual hinge 31 may be configured with a corresponding swivel pin joint 65b having an axis of rotation colinear with a mounting hole or mounting point in the individual hinge 31.

Figure 12:
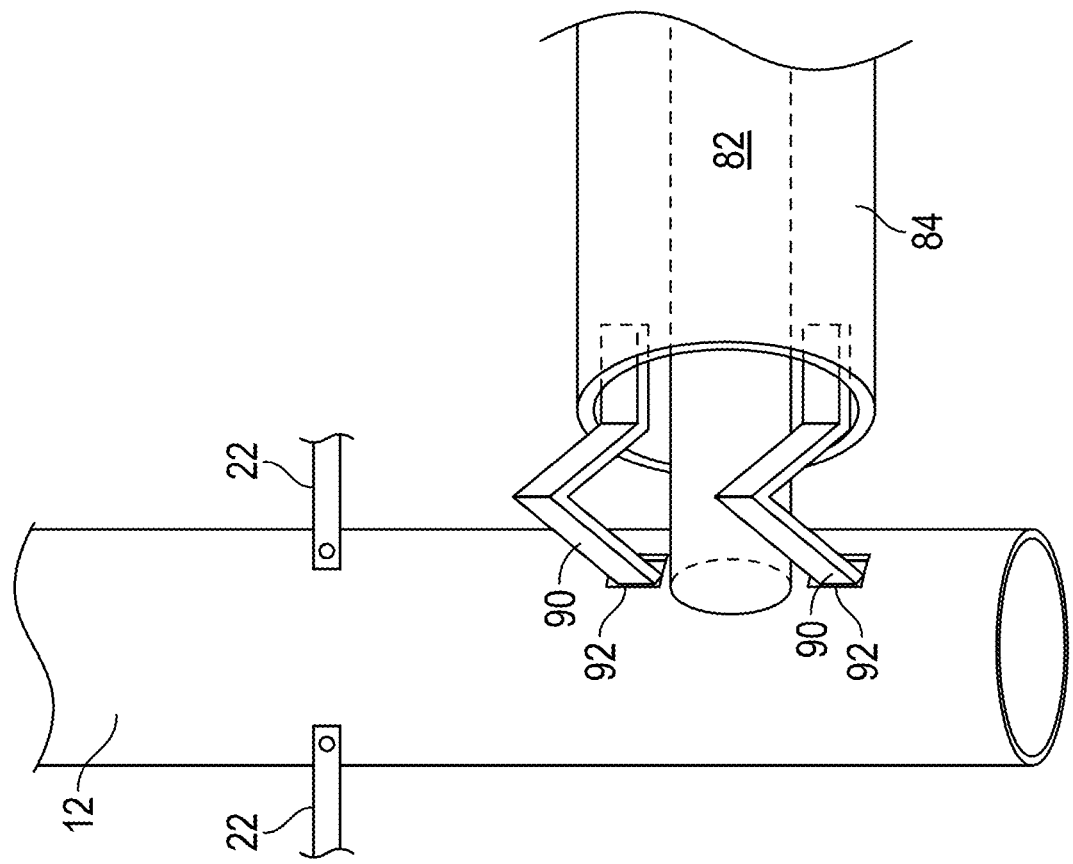
FIG. 12 is a perspective detail view showing a securing sleeve engaging with a main support rod.
Figure 11:
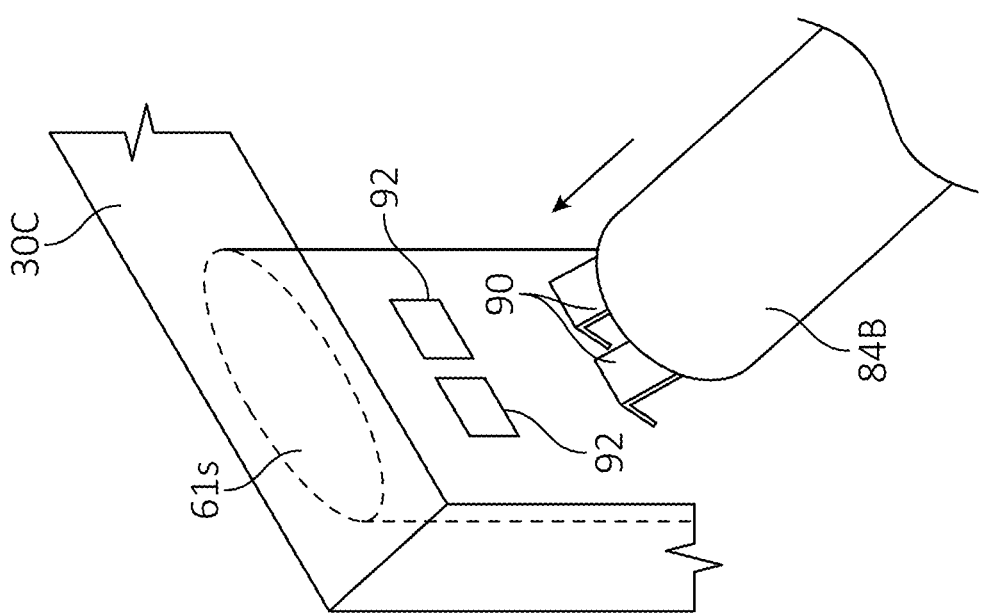
FIG. 11 is a perspective detail view showing a panel outer edge engaging with a support arm to lock the panel in position.

With continued reference to FIG. 10, the securing sleeves 84 and the main support rod 12 are configured to rotationally lock the securing sleeve 84 and the respective post 82 based on releasably locking the securing sleeve 84 to the main support rod 12 using hooks 90 in the securing sleeve 84 configured to engage with slots 92 in the main support rod 12 (depicted at least by FIG. 12 for example). Each securing sleeve 84 may rotate about the longitudinal axis of the respective post 82 unless the securing sleeve 84 and main support rod 12 are locked together using the hooks 90 and slots 92. Each securing sleeve 84 is configured in mechanical union with a support arm 84b that rotates with the securing sleeve 84. Each support arm 84b is configured with hooks 90 to releasably lock with slots 92 in one of the respective panels 30c (depicted at least by FIG. 11 for example). To place the device in an exemplary stowed position the securing sleeves 84 are disengaged from the two panels 30c and the main support rod 12 and the securing sleeves 84 are rotated about the posts 82 permitting the support arms 84b to lie on the panels 30b in the plane of the roof. To deploy the device to a vertical deployed position from the stowed position, the two panels 30c are rotated from their horizontal positions disposed within the perimeter of and in the plane of the roof to vertical positions perpendicular to the plane of the roof, the securing sleeves 84 are rotated approximately 90 degrees permitting the support arms 84b to rotate from a stowed position lying in the plane of the roof to a vertical position perpendicular to the plane of the roof, the securing sleeves 84 are locked to the main support rod 12, and the support arms 84b are locked to their respective panel 30c. In the implementation depicted by FIG. 10 the movable panels 30c comprise the plurality of rigid ribs 61 and the perimeter support rods 62 configured in accordance with what has been disclosed herein. The implementation depicted by FIG. 10 also comprises the hollow ribs 61s configured at each end of the two panels 30c. In the depicted implementation the hollow ribs 61s may be tubular or a hollow cylindrical structure having an open space retained within a perimeter of each hollow rib 61s. Each hollow rib 61s may be configured with apertures that may be aligned with the slots 92 in the panel 30c, permitting the hooks 90 configured in the support arms 84b to engage the hollow rib 61s perimeter through the slots 92 in the panel 30c as depicted in detail by FIG. 11. Engaging the hooks 90 in the support arms 84b with the hollow rib 61s perimeter through the slots 92 in the panel 30c secures the hollow ribs 61s vertically and horizontally, improving structural strength and overall stability of the device.

With continued reference to FIG. 10, locking the panels 30c to the support arms 84b and locking the securing sleeves 84 to the main support rod 12 secures the panels 30c and substantially prevents the panels 30c from moving. For example in some implementations the device may be implemented with panels configured to deflect in response to contact by a force, in accordance with techniques disclosed herein using swivel pin joints and/or compression springs. In such a case locking the panels 30c to the support arms 84b and locking the securing sleeves 84 to the main support rod 12 prevents the structure from deflecting when the panels 30c are in a vertical deployed position. Locking the panels 30c to the support arms 84b and locking the securing sleeves 84 to the main support rod 12 strengthens the overall structure, improving stability of the shield as a base for a pop-up storage compartment. The panels may comprise supports configured to support a canopy to provide a sheltered pop-up compartment with storage or living space within the sheltered compartment for stored items or temporary shelter for human users.

In reference to FIG. 12, the post 82 is permanently attached to the main support rod 12. The securing sleeve 84 fits over the post 82. The hooks 90 and the slots 92 connect the securing sleeve 84 to the main support rod 12. The hooks 90 arranged in the depicted end of the securing sleeve 84 and the slots 92 arranged in the main support rod 12 are configured to connect the securing sleeve 84 to the main support rod 12. In the depicted configuration the hooks 90 and slots 92 are positioned outside the outer edge of the post 82. The hooks 90 may be welded to the securing sleeve 84. The hooks 90 may be attached to the outer edge or an inner edge of the securing sleeve 84, or the hooks 90 may be integral with the securing sleeve 84. The securing sleeve 84 may rotate about the longitudinal axis of the post 82 when the hooks 90 are not engaged with the slots 92. When the hooks 90 are engaged with the slots 92 the securing sleeve 84 is locked in position relative to the main support rod 12 and the post 82. Locking the securing sleeve 84 in position relative to the main support rod 12 and the post 82 locks the panels 30c (depicted at least by FIGS. 10 and 13 for example) in position. The straps 22 attached to the man support rod 12 may be used to secure the panels 30c to the main support rod 12 in the stowed position of the panels 30c.

Figure 13:
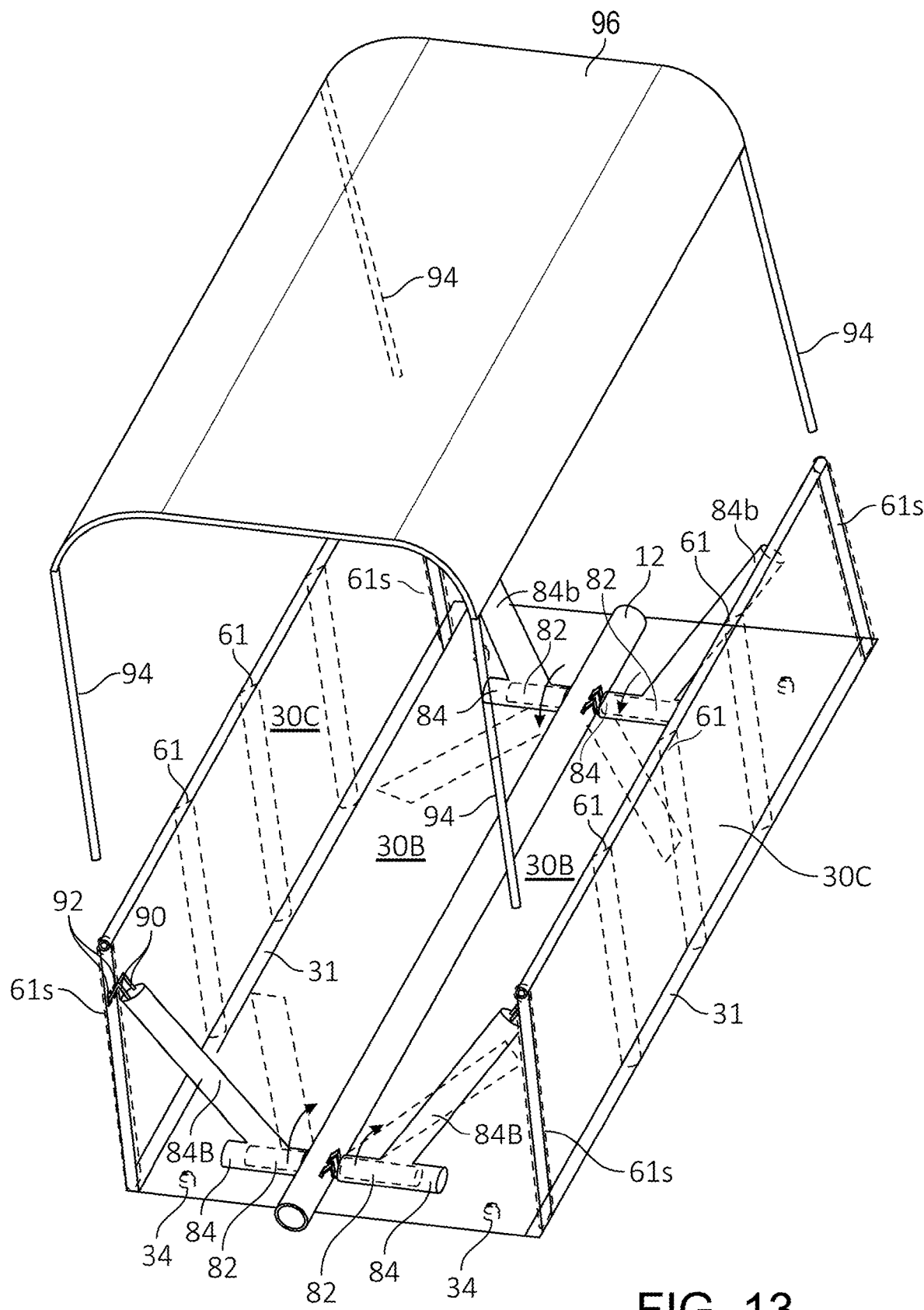
FIG. 13 is a top perspective exploded view of the device in an exemplary pop-up shelter configuration.

In reference to FIG. 13, the depicted implementation is shown in a pop-up sheltered compartment configuration with the movable panels 30c locked vertically and perpendicular with the immovable panels 30b. In the depicted example the pop-up sheltered compartment configuration includes the four shelter support rods 94 in the hollow ribs 61s to support the shelter canopy 96, providing a sheltered space for stored items or temporary shelter for users.

Figure 14A:
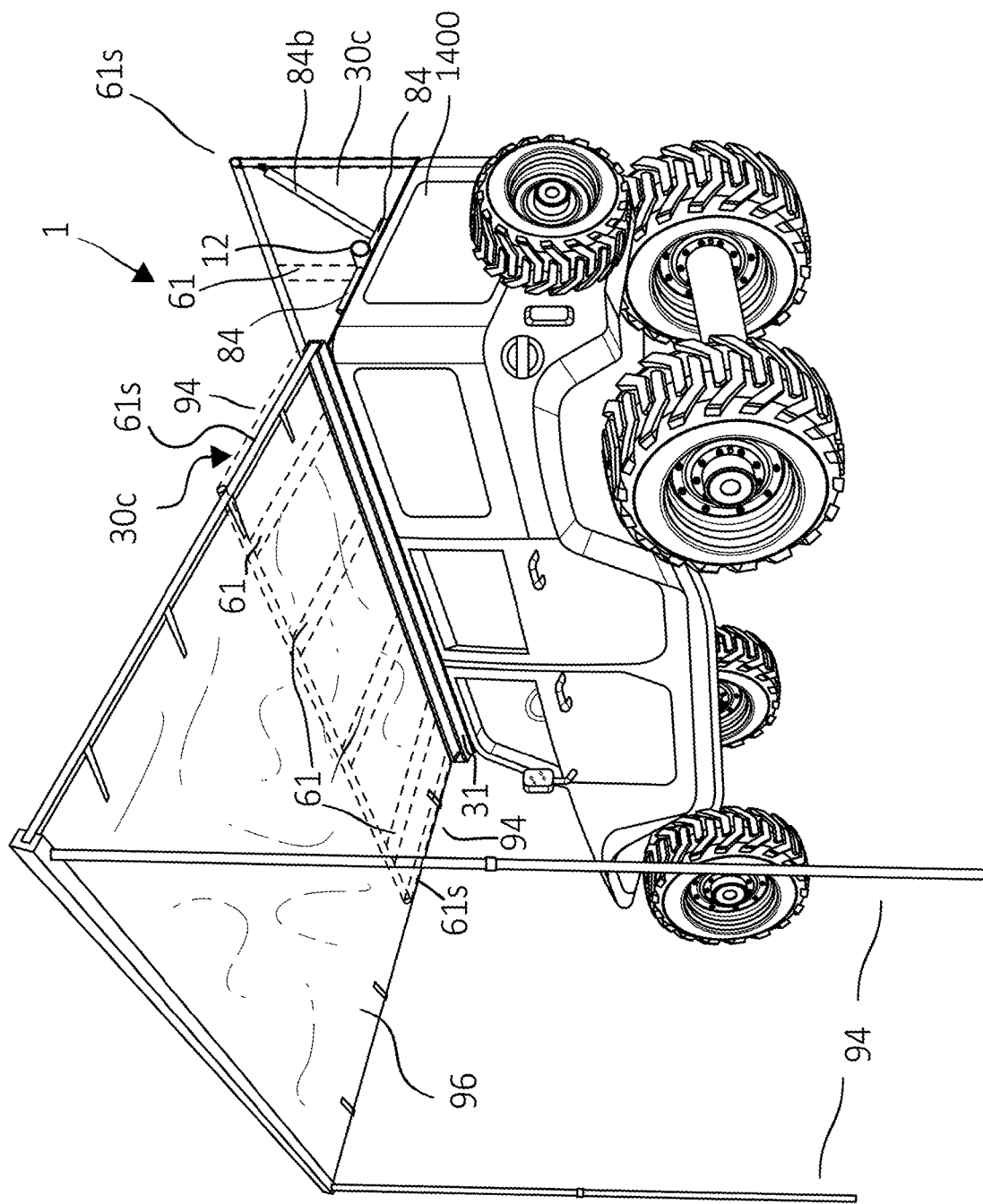
FIGS. 14A-14C together show perspective operational views of the device in exemplary pop-up shelter configurations.
Figure 14B:
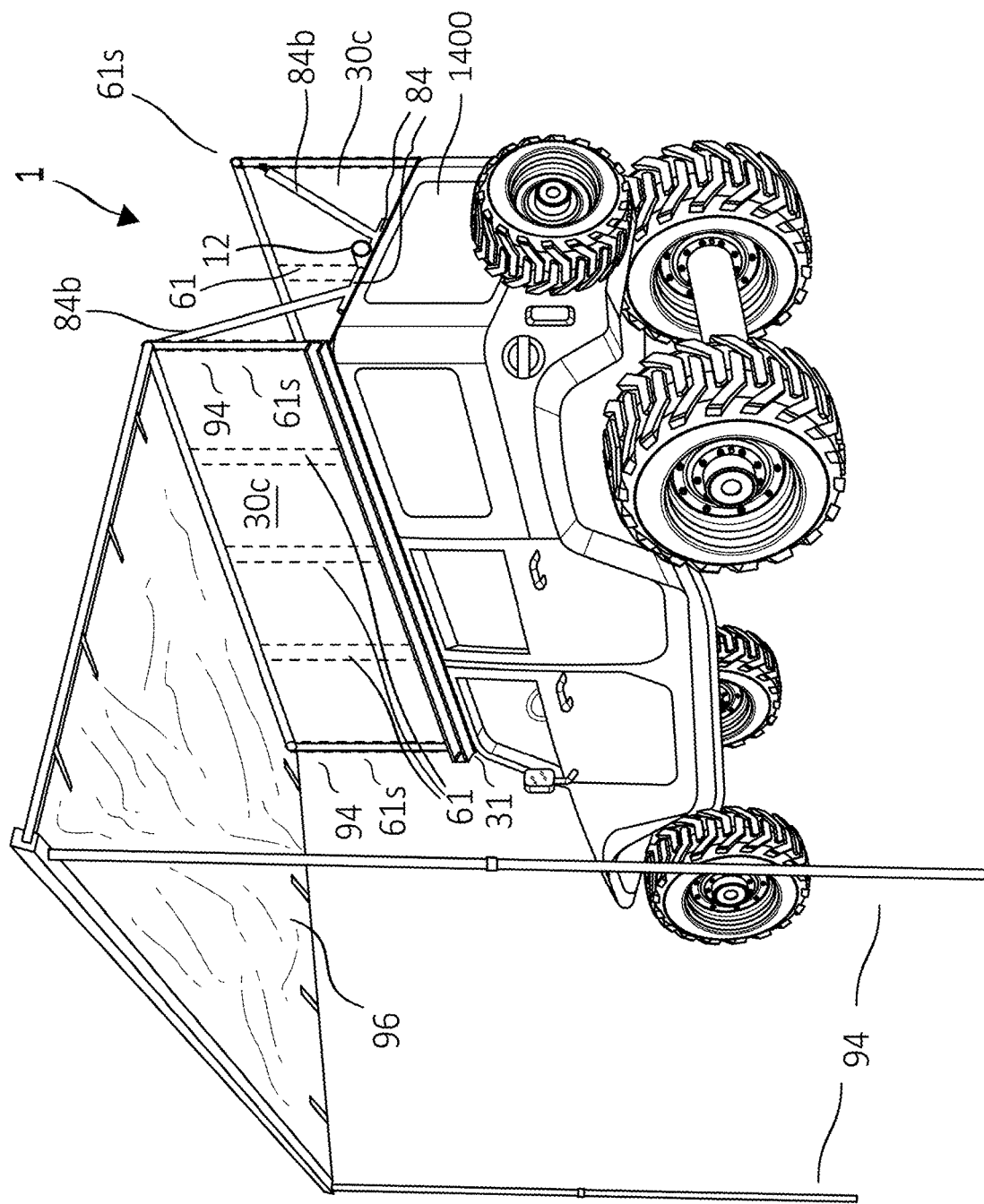
Figure 14C:
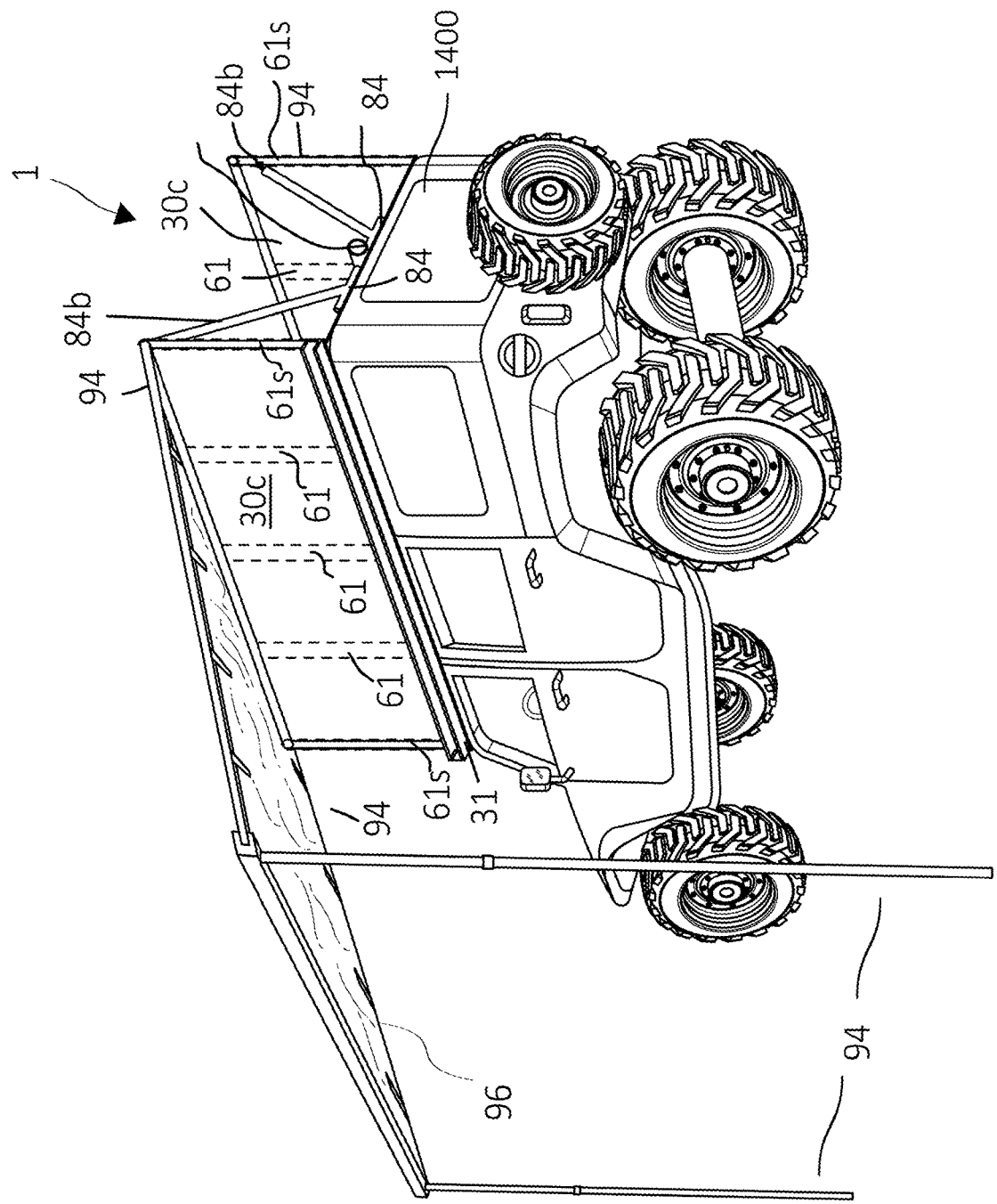

In reference to FIGS. 14A-14C, the depicted implementation is shown in operational pop-up shelter configurations providing an awning deployed to the side of a vehicle. In the depicted examples the device 1 is semi-permanently attached to the vehicle 1400 in accordance with what has been disclosed herein. The vehicle 1400 may be any type of vehicle. The depicted vehicle 1400 is a sport utility vehicle (SUV). In the embodiments depicted by FIGS. 14A-14C the device 1 may comprise the features in accordance with what has been disclosed herein at least with reference to FIGS. 6-13.

In FIG. 14A, the driver side panel 30c is extended from the vehicle and the extended panel 30c is positioned in the plane of the vehicle roof. In the embodiment depicted by FIG. 14A the shelter canopy 96 is disposed substantially parallel with the plane of the roof with the shelter support rods 94 engaged in the hollow ribs 61s of the driver side panel 30c.

In FIG. 14B, the driver side panel 30c is locked in a vertical position perpendicular with the plane of the roof and the shelter canopy 96 slopes down and away from the vehicle 1400.

In FIG. 14C, the shelter support rods 94 distal from the vehicle are shorter than the corresponding shelter support rods 94 in FIG. 14B, providing a steeper slope down and away from the vehicle 1400 for the shelter canopy 96.

A method may comprise: configuring two pair of stackable panels comprising an immovable bottom panel and movable top panel, wherein the two pair of stacked panels are sized to fit within the perimeter of a golf cart roof; configuring the movable panels to be adjustable between a retracted rectilinear position comprising the panels disposed within the perimeter of the roof, a half-open rectilinear position wherein the panels are perpendicular to the golf cart roof and an open rectilinear position wherein the panels extend beyond the roof; and configuring at least one movable panel to deflect from the open rectilinear position to an open deflected parallelogram position when the at least one panel is contacted by a force.

The method may further comprise connecting each movable panel of each pair of stackable panels to their respective bottom panel.

The movable panels may be movable relative to the immovable panel and the roof surface when in the open rectilinear position.

The pair of stackable panels may comprise lightweight waterproof material comprising plastic, high impact polyethylene, fiberglass, or composite material.

The movable panels may be configured to automatically return from the deflected position back to the open rectilinear position when the force is removed.

The method may further comprise locking at least one movable panel in the half-open rectilinear position.

The movable panels may be connected to the immovable panels using at least one hinge having a proximal and distal end, and the immovable panels are connected to a main support bar detachably attached to the roof of the golf cart wherein the main support bar bifurcates the golf cart roof from front to rear.

The movable panels may be configured with at least two swivel pin joints collocated with the proximal and distal end of the at least one hinge.

An axis of rotation of the at least two swivel pin joints may be aligned with at least two mounting apertures in the at least one hinge and at least two mounting apertures in at least one movable panel.

The at least two swivel pin joints may be arranged between one of the hinges and one of the movable panels.

A plurality of support arms may be coupled to the main support bar, wherein the plurality of support arms is configured to lock the pair of movable panels in the half-open rectilinear position when each support arm of the plurality of support arms is releasably engaged with the pair of movable panels, and wherein each support arm of the plurality of support arms is configured to be rotatable and lie between the movable and immovable panels in the plane of the golf cart roof when the movable panels are in the retracted rectilinear position.

Coupling the plurality of support arms to the main support rod may further comprise configuring the main support rod with a respective plurality of posts having a longitudinal axis substantially perpendicular to the longitudinal axis of the main support rod, wherein each post of the plurality of posts comprises a solid elongated cylindrical structure fixed to the main support rod.

Lock the pair of movable panels in the half open rectilinear position may further comprise releasably engaging at least one hook configured in at least one support arm with at least one slot configured in at least one movable panel.

The plurality of support arms may be configured with a respective plurality of securing sleeves in mechanical union with the respective plurality of support arms, wherein each securing sleeve of the plurality of securing sleeves comprises a hollow tubular structure configured to fit over and rotationally engage with the respective plurality of posts.

Locking the pair of movable panels in the half open rectilinear position may further comprise fitting at least one securing sleeve of the plurality of securing sleeves over at least one post and releasably engaging at least one hook configured in the at least one securing sleeve with at least one slot configured in the main support rod.

The method may further comprise configuring each movable panel with a plurality of hollow ribs configured to individually engage with individual shelter support rods.

The method may further comprise erecting a shelter over the golf cart roof.

An apparatus may comprise: two pair of stackable panels comprising an immovable bottom panel and movable top panel, wherein the two pair of stacked panels are sized to fit within the perimeter of a golf cart roof, wherein the movable panels are configured to be adjustable between a retracted rectilinear position comprising the panels disposed within the perimeter of the roof, a half-open rectilinear position wherein the panels are perpendicular to the golf cart roof and an open rectilinear position wherein the panels extend beyond the roof; and at least one movable panel is configured to deflect from the open rectilinear position to an open deflected parallelogram position when the at least one panel is contacted by a force.

Each movable panel of each pair of stackable panels may be connected to their respective bottom panel.

The pair of stackable panels may comprise lightweight waterproof material comprising plastic, high impact polyethylene, fiberglass, or composite material.

The apparatus may further comprise at least one hinge connecting the movable panels to the immovable panels, said hinge having a proximal and distal end, and a main support bar detachably attached to the roof of the golf cart, said main support bar connected to the immovable panels.

The apparatus may further comprise at least two swivel pin joints collocated with the proximal and distal end of the at least one hinge on the moveable panels.

The apparatus may further comprise at least two swivel pin joints with at least two mounting apertures in the at least one hinge and at least two mounting apertures in at least one movable panel.

The at least two swivel pin joints may be between one of the hinges and one of the movable panels.

The apparatus may further comprise a plurality of rotatable support arms coupled to the main support bar.

The apparatus may further comprise a plurality of posts having a longitudinal axis substantially perpendicular to the longitudinal axis of the main support bar, wherein each post of the plurality of posts comprises a solid elongated cylindrical structure fixed to the main support bar.

The apparatus may further comprise at least one hook configured in at least one support arm to releasably engage with at least one slot configured in at least one movable panel.

The apparatus may further comprise a respective plurality of securing sleeves in mechanical union with the respective plurality of rotatable support arms, wherein each securing sleeve of the plurality of securing sleeves comprises a hollow tubular structure configured to fit over and rotationally engage with a respective plurality of posts.

The apparatus may further comprise at least one hook configured in the at least one securing sleeve to releasably engage with at least one slot configured in the main support bar.

The apparatus may further comprise a plurality of hollow ribs in the movable panels configured to individually engage with individual shelter support rods.

In illustrative examples apparatus and method implementations of the invention enhance vehicle rain and sun protection and provide a pop-up sheltered compartment on the vehicle roof using a rain and sun shield device. The vehicle may be a golf cart or other type of vehicle having a roof. The rain and sun shield for a covered vehicle is semi-permanently attached to the roof of the vehicle. The device is easy to install; will retrofit to any standard vehicle roof; and does not interfere with the parking and storing profile (i.e. is sized to fit within the perimeter of any vehicle roof when in the closed position) of a fleet of vehicles. The device is easily opened and closed to provide added sun and rain protection. An implementation may have movable panels that lock perpendicular with the plane of the roof, providing a pop-up sheltered compartment for stored items or temporary shelter for users.

Herein described are embodiments of the rain and sun shield for a vehicle. The vehicle may be a covered golf cart or any other type of vehicle having a roof. For brevity and simplicity of disclosure various implementations are disclosed and depicted with reference herein to a golf cart, however embodiments of the invention are suitable for use with a vehicle of any type. The rain and sun shield may be semi-permanently attached (i.e. detachably attached) to the roof of the vehicle. Methods for enhancing the rain and sun protection of a vehicle roof using a rain and sun shield device are also disclosed. An implementation of the disclosed rain and sun shield may be configured as a base for a collapsible shelter with panels that pop-up from the base and lock into a vertical position to form sides for a compartment on the vehicle roof. The compartment may be capped by a canopy providing storage or living space within the sheltered compartment for stored items or temporary shelter for human users. An implementation of the disclosed rain and sun shield design may be semi-permanently attached to the roof of a vehicle. The device is easy to install; will retrofit to any standard golf cart roof and does not interfere with the parking and storing profile of a fleet of golf carts. The device is easily opened and closed to provide the golf cart user with added sun and rain protection when in use. The target market with these embodiments are users of golf carts, sport utility vehicles, vans, campers, cars and trucks as well as manufacturers and fleet users of such vehicles whether for golf courses, retirement communities, camping, touring/traveling or resort communities just to name a few. In summary, various embodiments of rain and sun shield devices for a covered golf carts may semi-permanently attach to the roof of a vehicle. These embodiments are easy to install; retrofit to any standard golf cart roof; and will not interfere with the parking and storing profile (i.e. are sized to fit within the perimeter of any standard golf cart roof when in the closed position) of a fleet of golf carts. In the embodiments, the devices attach to the golf cart roof such as by rivet or screws or other mechanical fasteners for a semi-permanent attachment.

The disclosed embodiments may generally be used with any vehicle roof. The panels may be sized relative to the vehicle roof. The vehicle may be a golf cart, sport utility vehicle, van, car, camper or truck. For example, in the case of a golf cart, the panels may be sized based on the golf cart roof. In an embodiment, two sets of panels each half the size of the golf cart roof are attached such as by hinges to a main support bar similar to the main support bar of the portable device. For example the length of an exemplary two person golf cart roof from front to back is 60 inches and right to left 48 inches across. These two sets of panels lie stacked on each side of the golf cart support bar. The two sets of stacked panels are identical in size and shape. The bottom panel is attached or hinged to the outer edge of the bottom panel. In the closed position, the two panels are stacked and locked down to the support bar. Once unlocked from the support bar the top panel flips open using a hinge mechanism to extend the top panel beyond the right and left sides of the golf cart roofline to provide the users of the golf cart added protection from the sun and rain.

In another embodiment, rather than the stacked configuration using a hinge mechanism, the top panel is now inside the bottom panel so it can telescope out beyond the vehicle right and left side of the roof line. The vehicle may be a golf cart or any other type of vehicle having a roof. Alternatively, a single panel can be stowed in a housing cavity and simply slide out beyond the sides of the golf cart roof to provide added sun and rain protection. This embodiment may have a stop mechanism or latch to prevent the fully extended device from falling off. This embodiment makes use of rails to slide open and close the sun and rain shield.

In another embodiment, there are two main support bars or hinges semi-permanently attached to the vehicle roof. The vehicle may be a golf cart or any other type of vehicle having a roof. Each of the two main support bars or hinges is laid along the left and right perimeter of the golf cart and a single shield panel is attached to each support bar or hinge. In the locked or closed position the shield panel fits within half the frame of the golf cart roof. Once unlocked the panel flips 180 degrees over the support bar or hinge and extends beyond the side edges of the golf cart roof to provide sun and rain protection. Alternatively, multiple small hinges that attach semi-permanently to the golf cart roof can be used.

In another embodiment, two main support bars and hinges are, once again, laid along the top face of the roof of the vehicle toward the outside perimeter of the right and left side of the vehicle roof. The vehicle may be a golf cart or any other type of vehicle having a roof. The sun and rain shield is comprised of a flexible material covering a plurality of rigid ribs having an interior side and an exterior side. The interior side of each rib is attached to the main support rod and or hinge and the exterior side of the rib is attached to a perimeter support rod using swivel pin joints that allow the ribs to rotate relative to each other and the main support and perimeter support rods. A flexible, opaque fabric covers the rib array to provide users added protection from sun and rain. In the closed position the shield is like a collapsed wing that is spring loaded and nested within the roof line of the golf cart. Once unlocked, the spring loaded shield opens into a rectangular shape that swings forward or backward in the shape of a parallelogram when it comes in contact with pressure or resistance such as from brushing against a tree. In other words, this embodiment is collapsible as the ribs that connect the main support bar and the outer support rod rotate on the swivel pins in both the forward and backward directions. Alternatively, the flexible shade panels can be attached on one edge to a long piano hinge or multiple small hinges attached on one side directly to the roof of the golf cart and on the other side to one of the main support bar such that the panels can be readily rotated 180 degrees over the hinge to rest the panels on the top of the roof when not in use.

In another embodiment, a main support rod, two hinges and two panels are laid along the top face of the roof of the vehicle toward the outside perimeter of the right and left side of the vehicle roof. The two panels may lie in the plane of the roof or in a plane parallel with the plane of the roof. The vehicle may be a golf cart or any other type of vehicle having a roof. A main support rod is disposed in the plane of the roof and bifurcates the roof from front to rear. The main support rod is connected to the two panels laid along the top face of the roof of the vehicle. The two panels laid along the top face of the roof of the vehicle are immovable panels. The main support rod is configured with a plurality of posts. The plurality of posts are disposed perpendicular to the main support rod, and in the plane of the roof. A first end of each of the posts may be permanently attached to the main support rod. The hinges are disposed along the side edges of their respective panels laid on the vehicle roof. A third panel and a fourth panel are connected to the respective hinges disposed at respective side edges of the panels on the top face of the vehicle roof. The third panel and the fourth panel are movable panels. The hinges permit rotating the third and fourth panels from stowed positions disposed within the perimeter of and in the plane of the roof to vertical deployed positions perpendicular to the plane of the roof. Some implementations may be configured to permit rotating the third and fourth panels to horizontal deployed or extended positions parallel to the plane of the roof and partially beyond the surface of the roof. The third panel and the fourth panel may be configured to deflect based on swiveling when contacted by a force, using design techniques based on swivel pin joints and/or compression springs disclosed herein. A plurality of securing sleeves fit over the respective plurality of posts' second ends to rotationally couple or engage each securing sleeve with the respective post. In this configuration each securing sleeve may rotate about the longitudinal axis of the respective post. The securing sleeves and the main support rod are configured to rotationally lock the securing sleeve and the respective post based on releasably locking the post to the main support rod. Each securing sleeve may rotate about the longitudinal axis of the respective post unless the securing sleeve and main support rod are locked together. Each securing sleeve is configured in mechanical union with a support arm that rotates with the securing sleeve. Each support arm is configured to releasably lock with a respective panel that has been rotated to a vertical position perpendicular to the plane of the roof. When the device is in an exemplary stowed position the securing sleeves are disengaged from the panels and the main support rod and the securing sleeves are rotated about the posts permitting the securing sleeves to lie on the roof in the plane of the roof. To deploy the device to a vertical deployed position from the stowed position, the panels are rotated from their horizontal positions disposed within the perimeter of and in the plane of the roof to vertical positions perpendicular to the plane of the roof, the securing sleeves are rotated approximately 90 degrees from a stowed position lying in the plane of the roof to a vertical position perpendicular to the plane of the roof, the posts are locked to the main support rod, and the support arms are locked to their respective panel. Locking the panels to the support arms and locking the panels to the main support rod prevents the panels from deflecting in response to contact by a force and strengthens the overall structure, improving stability of the shield as a base for a pop-up storage compartment. The panels may comprise supports configured to support a canopy to provide a sheltered pop-up compartment with storage or living space within the sheltered compartment for stored items or temporary shelter for human users.

In these embodiments, the device provides shelter to occupants of a golf cart from sun and rain when deployed on top of a golf cart. The device can shelter people standing or sitting next to a golf cart from sun and rain. In one embodiment, the device can be deployed on an ATV or other small transport vehicle instead of a golf cart. These and other advantages of the invention will be further understood and appreciated by those skilled in the art by reference to the following written specification, claims and appended drawings.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise. The terms "deployed", "extended", "open" and "in use" are used interchangeably and intended to have the same meaning as it related to the function and operation of the device. Similarly, the terms "undeployed" "unextended", closed, "stowed", "retracted" and "not in use", are used interchangeably and intended to have the same meaning as it related to the function and operation of the device. Finally, "panels" and "shield panels" are used interchangeably and intended to have the same meaning as it related to the function and operation of the device.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

For the sake of brevity and legibility, the present disclosure does not explicitly recite each and every permutation that may be obtained by choosing from the disclosed features. However, the present disclosure is to be interpreted as explicitly disclosing all such permutations. For example, a system described as having three possible features may be implemented in seven different ways, namely with just one of the three possible features, with any two of the three possible features or with all three of the three possible features. The disclosed features may be combined in any configuration excepting those readily apparent to the person skilled in the art as nonsensical.

Elements described herein as coupled or connected may have an effectual relationship realizable by a direct connection or indirectly with one or more other intervening elements. As used herein the phrases "connected to," "coupled to" and "in communication with" and their equivalents refer to any form of interaction between two or more entities, including mechanical, electrical, magnetic, electromagnetic, fluid, and thermal interaction. Components may be functionally coupled to each other even though they are not in direct contact with each other. The terms "abutting" or "in mechanical union" refer to items that are in direct physical contact with each other, although the items may not necessarily be attached together.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A method comprising:
   configuring two pair of stackable panels comprising an immovable bottom panel and movable top panel, wherein the two pair of stacked panels are sized to fit within the perimeter of a golf cart roof;
   configuring the movable panels to be adjustable between a retracted rectilinear position comprising the panels disposed within the perimeter of the roof, a half-open rectilinear position wherein the panels are perpendicular to the golf cart roof and an open rectilinear position wherein the panels extend beyond the roof; and
   configuring at least one movable panel to deflect from the open rectilinear position to an open deflected parallelogram position when the at least one panel is contacted by a force.

2. The method of claim 1, further comprising connecting each movable panel of each pair of stackable panels to their respective bottom panel.

3. The method of claim 1, wherein the movable panels are movable relative to the immovable panel and the roof surface when in the open rectilinear position.

4. The method of claim 1, wherein the pair of stackable panels comprises lightweight waterproof material comprising plastic, high impact polyethylene, fiberglass, or composite material.

5. The method of claim 1, wherein the movable panels are configured to automatically return from the deflected position back to the open rectilinear position when the force is removed.

6. The method of claim 1, wherein the method further comprises locking at least one movable panel in the half-open rectilinear position.

7. The method of claim 1, wherein the movable panels are connected to the immovable panels using at least one hinge having a proximal and distal end, and the immovable panels are connected to a main support bar detachably attached to the roof of the golf cart wherein the main support bar bifurcates the golf cart roof from front to rear.

8. The method of claim 7, wherein the method further comprises configuring the movable panels with at least two swivel pin joints collocated with the proximal and distal end of the at least one hinge.

9. The method of claim 8, wherein the method further comprises aligning an axis of rotation of the at least two swivel pin joints with at least two mounting apertures in the at least one hinge and at least two mounting apertures in at least one movable panel.

10. The method of claim 9, wherein the method further comprises coupling a plurality of support arms to the main support bar, wherein the plurality of support arms is configured to lock the pair of movable panels in the half-open rectilinear position when each support arm of the plurality of support arms is releasably engaged with the pair of movable panels, and wherein each support arm of the plurality of support arms is configured to be rotatable and lie between the movable and immovable panels in the plane of the golf cart roof when the movable panels are in the retracted rectilinear position.

11. The method of claim 10, wherein coupling the plurality of support arms to the main support rod further comprises configuring the main support rod with a respective plurality of posts having a longitudinal axis substantially perpendicular to the longitudinal axis of the main support rod, wherein each post of the plurality of posts comprises a solid elongated cylindrical structure fixed to the main support rod.

12. The method of claim 11, wherein the method further comprises configuring the plurality of support arms with a respective plurality of securing sleeves in mechanical union with the respective plurality of support arms, wherein each securing sleeve of the plurality of securing sleeves comprises a hollow tubular structure configured to fit over and rotationally engage with the respective plurality of posts.

13. The method of claim 12, wherein locking the pair of movable panels in the half open rectilinear position further comprises fitting at least one securing sleeve of the plurality of securing sleeves over at least one post and releasably engaging at least one hook configured in the at least one securing sleeve with at least one slot configured in the main support rod.

14. The method of claim 10, wherein locking the pair of movable panels in the half open rectilinear position further comprises releasably engaging at least one hook configured in at least one support arm with at least one slot configured in at least one movable panel.

15. The method of claim 8, wherein the method further comprises arranging the at least two swivel pin joints between one of the hinges and one of the movable panels.

16. The method of claim 1, wherein the method further comprises configuring each movable panel with a plurality of hollow ribs configured to individually engage with individual shelter support rods.

17. The method of claim 16, wherein the method further comprises erecting a shelter over the golf cart roof.

18. An apparatus comprising:
two pair of stackable panels comprising an immovable bottom panel and movable top panel, wherein the two pair of stacked panels are sized to fit within the perimeter of a golf cart roof,
wherein the movable panels are configured to be adjustable between a retracted rectilinear position comprising the panels disposed within the perimeter of the roof, a half-open rectilinear position wherein the panels are perpendicular to the golf cart roof and an open rectilinear position wherein the panels extend beyond the roof; and
at least one movable panel is configured to deflect from the open rectilinear position to an open deflected parallelogram position when the at least one panel is contacted by a force.

19. The apparatus of claim 18, wherein each movable panel of each pair of stackable panels is connected to their respective bottom panel.

20. The apparatus of claim 18, wherein the pair of stackable panels comprises lightweight waterproof material comprising plastic, high impact polyethylene, fiberglass, or composite material.

21. The apparatus of claim 18, further comprises at least one hinge connecting the movable panels to the immovable panels, said hinge having a proximal and distal end, and a main support bar detachably attached to the roof of the golf cart, said main support bar connected to the immovable panels.

22. The apparatus of claim 21, further comprises at least two swivel pin joints collocated with the proximal and distal end of the at least one hinge on the moveable panels.

23. The apparatus of claim 22, further comprises at least two swivel pin joints with at least two mounting apertures in the at least one hinge and at least two mounting apertures in at least one movable panel.

24. The apparatus of claim 22, wherein the at least two swivel pin joints are between one of the hinges and one of the movable panels.

25. The apparatus of claim 21, further comprising a plurality of rotatable support arms coupled to the main support bar.

26. The apparatus of claim 25, further comprises a respective plurality of securing sleeves in mechanical union with the respective plurality of rotatable support arms, wherein each securing sleeve of the plurality of securing sleeves comprises a hollow tubular structure configured to fit over and rotationally engage with a respective plurality of posts.

27. The apparatus of claim 26, further comprises at least one hook configured in the at least one securing sleeve to releasably engage with at least one slot configured in the main support bar.

28. The apparatus of claim 21, a plurality of posts having a longitudinal axis substantially perpendicular to the longitudinal axis of the main support bar, wherein each post of the plurality of posts comprises a solid elongated cylindrical structure fixed to the main support bar.

29. The apparatus of claim 21, further comprises at least one hook configured in at least one support arm to releasably engage with at least one slot configured in at least one movable panel.

30. The apparatus of claim 18, further comprises a plurality of hollow ribs in the movable panels configured to individually engage with individual shelter support rods.

* * * * *